United States Patent
Xu et al.

(10) Patent No.: US 12,120,473 B2
(45) Date of Patent: Oct. 15, 2024

(54) VIDEO SIGNAL PROCESSING METHOD AND APPARATUS

(71) Applicant: Huawei Technologies Co., Ltd., Guangdong (CN)

(72) Inventors: Weiwei Xu, Hangzhou (CN); Quanhe Yu, Beijing (CN); Hu Chen, Munich (DE); Xiaodong Xu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/659,253

(22) Filed: Apr. 14, 2022

(65) Prior Publication Data

US 2022/0239880 A1   Jul. 28, 2022

Related U.S. Application Data

(63) Continuation of application No. PCT/CN2020/115029, filed on Sep. 14, 2020.

(30) Foreign Application Priority Data

Oct. 18, 2019   (CN) .......................... 201910999369.0

(51) Int. Cl.
*H04N 9/68* (2023.01)
*H04N 9/77* (2006.01)

(52) U.S. Cl.
CPC .................. *H04N 9/68* (2013.01); *H04N 9/77* (2013.01)

(58) Field of Classification Search
CPC ............... H04N 9/68; H04N 9/77; H04N 9/64
USPC ........ 348/644–647, 662, 703, 708, 713, 631
See application file for complete search history.

(56) References Cited

U.S. PATENT DOCUMENTS

| | | | | |
|---|---|---|---|---|
| 5,467,438 | A * | 11/1995 | Nishio | .................. G06T 15/506 345/600 |
| 7,864,250 | B2 * | 1/2011 | Kanai | ...................... H04N 9/68 348/645 |
| 10,542,296 | B2 | 1/2020 | Lu et al. | |
| 2008/0284914 | A1 * | 11/2008 | Chen | ........................ H04N 9/77 348/E9.053 |
| 2009/0046046 | A1 * | 2/2009 | Mamba | ................ G09G 3/3406 345/88 |

(Continued)

FOREIGN PATENT DOCUMENTS

| | | |
|---|---|---|
| CN | 1989772 A | 6/2007 |
| CN | 105009580 A | 10/2015 |
| CN | 108090879 A | 5/2018 |

(Continued)

OTHER PUBLICATIONS

Smpte: Dynamic Metadata for Color vol. Transform Application #4 Table of Contents IEEE, Jan. 1, 2016 (Jan. 1, 2016) pp. 1-26, XP055453574 total:26pages.

*Primary Examiner* — Sherrie Hsia
(74) *Attorney, Agent, or Firm* — WOMBLE BOND DICKINSON (US) LLP

(57) ABSTRACT

A chrominance adjustment method and apparatus, and a storage medium are provided. The method includes: determining a color adjustment coefficient of a chrominance component of a color signal based on a reference display device maximum luminance value (RML) and/or a source maximum luminance value (SML); and adjusting the chrominance component of the color signal based on the color adjustment coefficient.

17 Claims, 8 Drawing Sheets

(56) References Cited

U.S. PATENT DOCUMENTS

2016/0005153 A1    1/2016   Atkins et al.
2018/0253834 A1    9/2018   Pouli et al.

FOREIGN PATENT DOCUMENTS

| CN | 108882028 | A | 11/2018 |
| CN | 108933933 | A | 12/2018 |
| CN | 108986769 | A | 12/2018 |
| EP | 3248367 | A1 | 11/2017 |
| IN | 107211076 | A | 9/2017 |
| WO | 2012142506 | A1 | 10/2012 |
| WO | 2014130343 | A2 | 8/2014 |
| WO | 2017024042 | A2 | 2/2017 |
| WO | 2017196869 | A1 | 11/2017 |

* cited by examiner

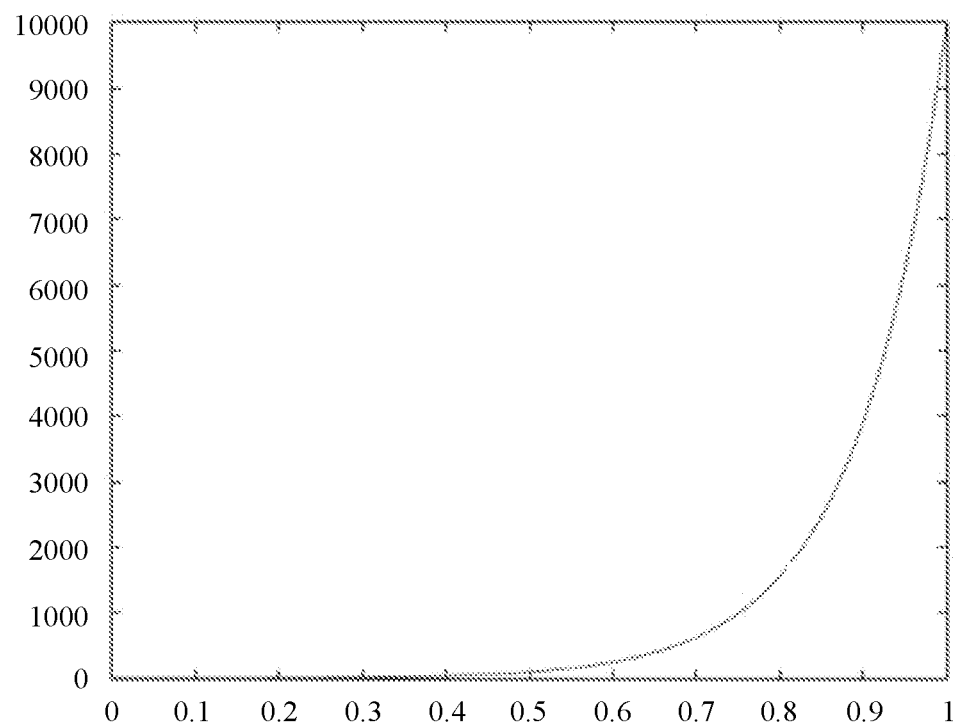
FIG. 1-a
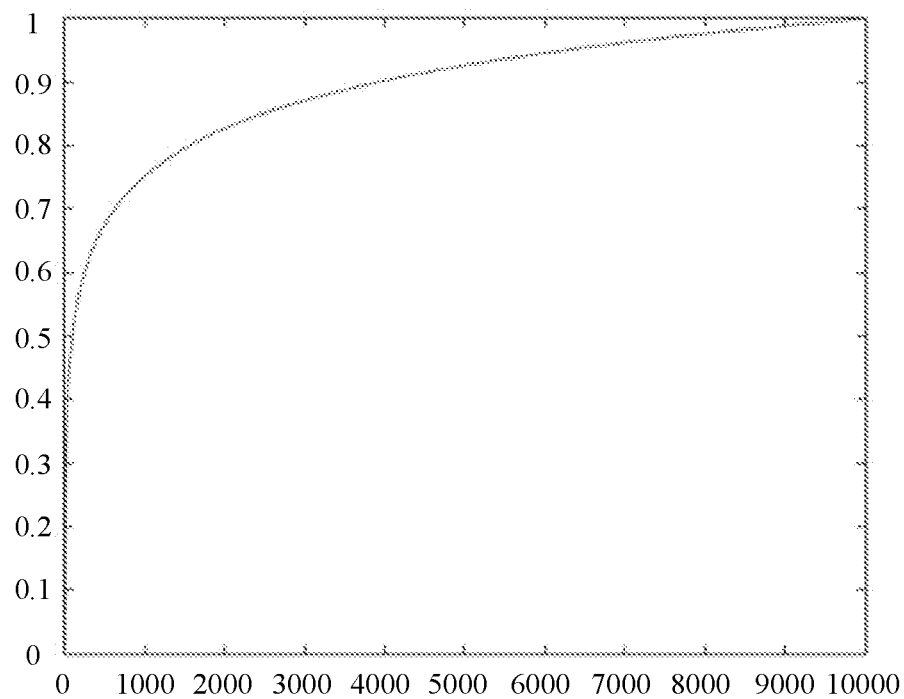
FIG. 1-b

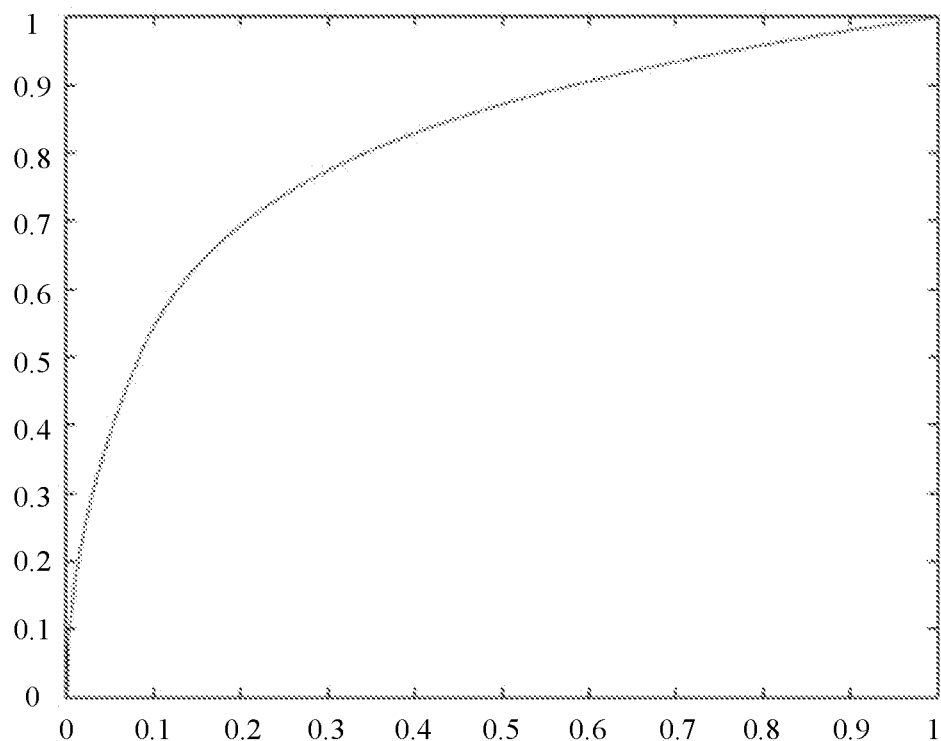
FIG. 2-a
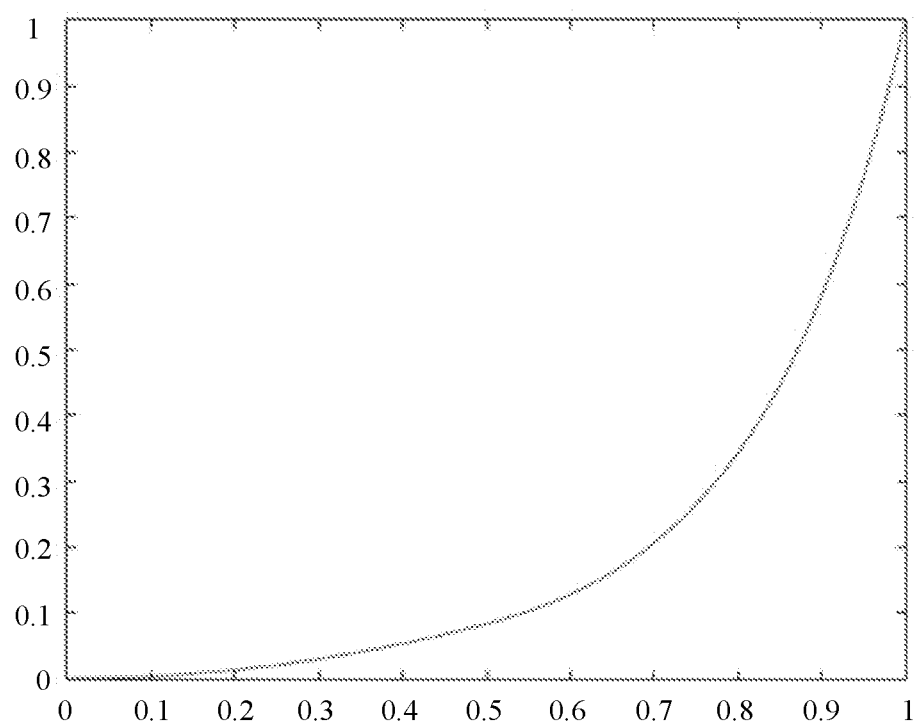
FIG. 2-b

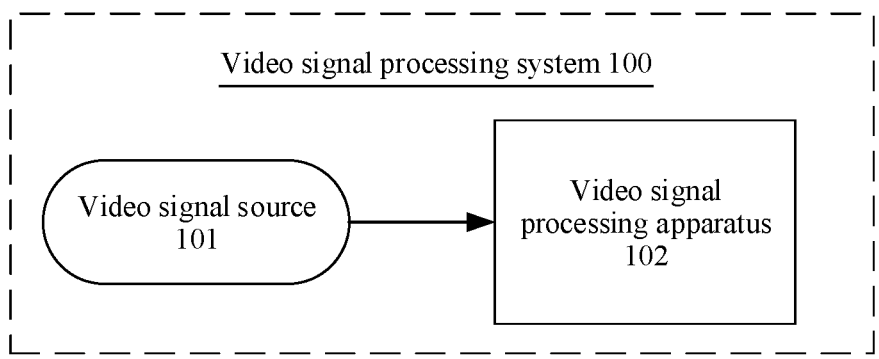
FIG. 3-a
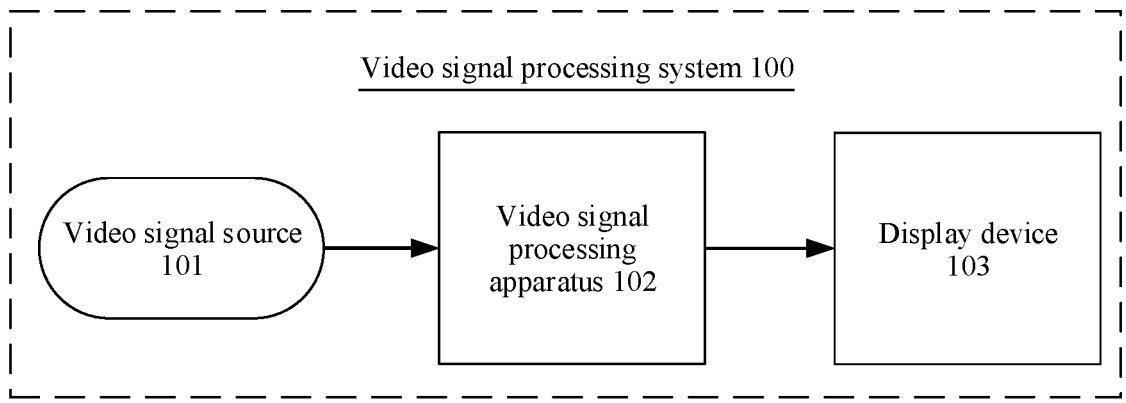
FIG. 3-b

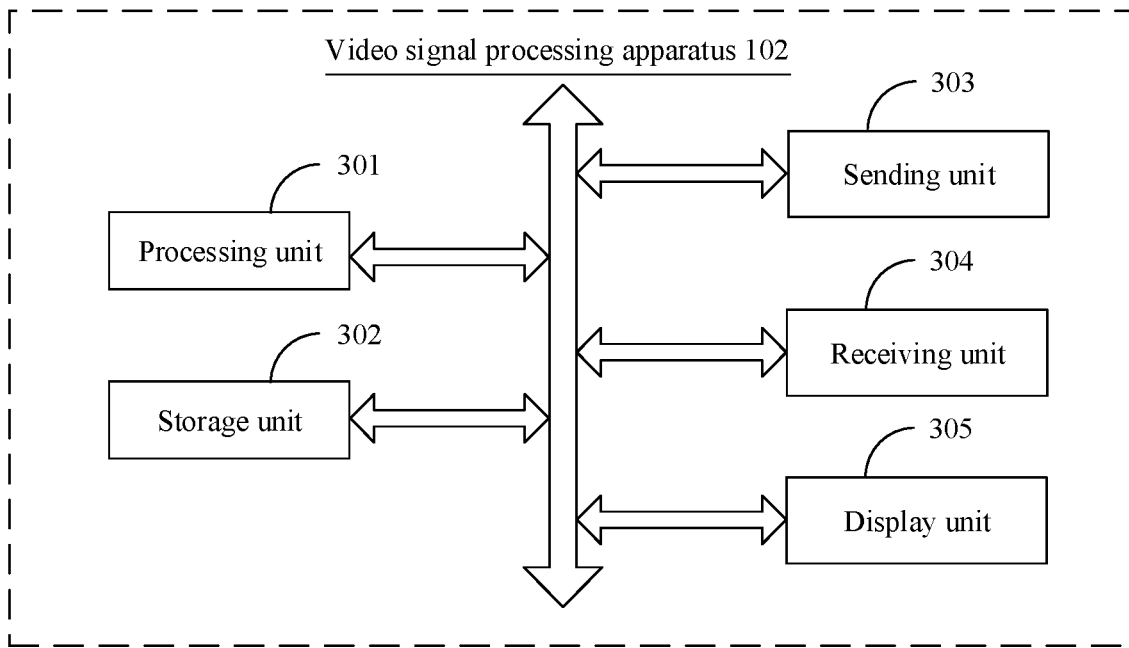
FIG. 3-c
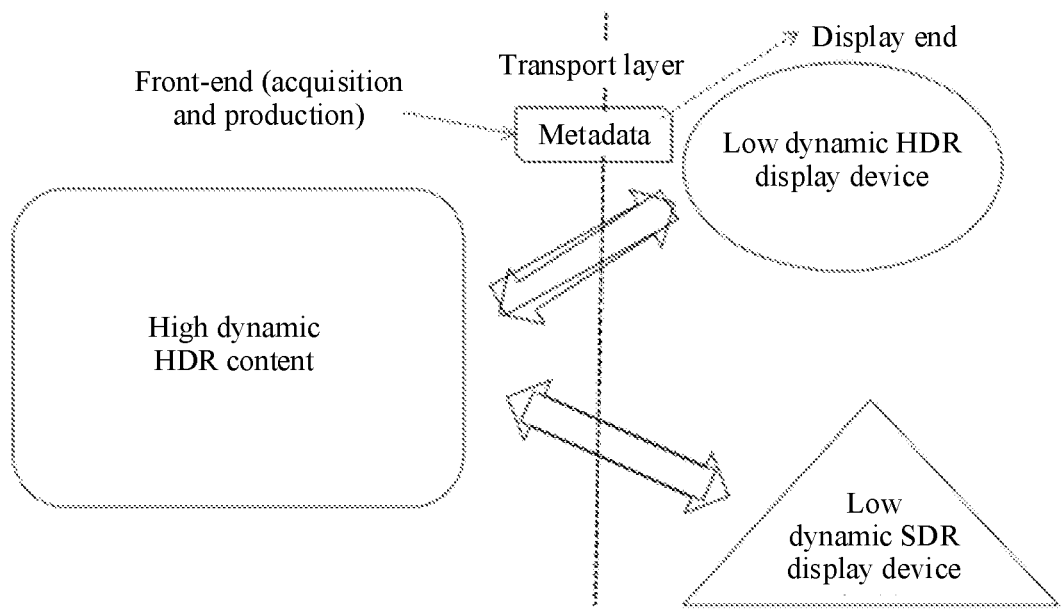
FIG. 4

VIDEO SIGNAL PROCESSING METHOD AND APPARATUS

CROSS-REFERENCE TO RELATED APPLICATION

This application is a continuation of International Application No. PCT/CN2020/115029, filed on Sep. 14, 2020, which claims priority to Chinese Patent Application No. 201910999369.0, filed on Oct. 18, 2019. The disclosures of the aforementioned applications are hereby incorporated by reference in their entireties.

TECHNICAL FIELD

This application relates to the field of display technologies, and in particular, to a video signal processing method and apparatus.

BACKGROUND

High dynamic range (HDR) is a hotspot technology recently emerging in the video industry, and is also a future development direction of the video industry. Compared with a conventional standard dynamic range (SDR) video signal, an HDR video signal has a larger dynamic range and higher luminance. However, a large quantity of existing display devices cannot reach luminance of the HDR video signal. Therefore, when the HDR video signal is displayed, luminance mapping processing needs to be performed on the HDR signal based on a capability of the display device, so that the HDR signal can be displayed on the current device. An HDR signal luminance processing method based on red-green-blue (RGB) space is a common method, and is widely applied to actual display devices.

A typical HDR video processing process includes: pre-processing, encoding, decoding, and post-processing. An HDR video is input, and undergoes processing performed by an optical-electro transfer function, color space transfer, floating-point-to-fixed-point conversion, 4:4:4-to-4:2:0 downsampling, and encoding performed by a 4:2:0 encoder, and a bitstream is obtained. The bitstream undergoes decoding performed by a 4:2:0 decoder, 4:2:0-to-4:4:4 upsampling, fixed-point-to-floating-point conversion, color space transfer, and processing performed by an electro-optical transfer function, and a finally output HDR video is obtained. A transfer function is used to perform non-linear transfer on an HDR source. The HDR video finally needs to be quantized to data that has an integral quantity of bits, and then is encoded. Considering that a dynamic range of the HDR video is far greater than a dynamic range of the data that has an integral quantity of bits, if linear quantization is directly performed, information of the HDR source is severely damaged. Therefore, the transfer function is mainly used to protect, through the non-linear transfer, a brightness segment that requires key protection.

A color signal is an optical signal in the real world, and may be represented by "L" or "E", usually records a value corresponding to a color component (for example, R, G, B, or Y), and is usually directly proportional to light intensity. A primary color signal of the picture may be expressed in real brightness (for example, 10000 nits), or may be expressed in normalized brightness, for example, based on that maximum brightness 10000 nits is normalized to maximum brightness 1. Processed picture information obtained after the primary color signal undergoes conversion processing is a numeric expression value of the picture, and a value of the processed picture information is normalized to [0,1]. The picture information may be represented by "L'" or "E'", which is usually used to indicate a nonlinear color value. Optical-electro transfer is performed on the primary color signal (normalized to [0,1]) by using the optical-electro transfer function, to obtain processed picture information. The processed picture information obtained through the transfer performed by the optical-electro transfer function may include primary colors such as R, G, B, and Y. Electro-optical transfer is performed on input picture information by using the electro-optical transfer function, to obtain an output primary color signal. The processed output primary color signal is a restored optical signal in the real world. The optical-electro transfer function (OETF) is sometimes referred to as an optical-electro transfer function or an optical-electro transfer curve. The electro-optical transfer function (EOTF) is sometimes referred to as an electro-optical transfer function or an electro-optical transfer curve. The optical-electro transfer curve and the electro-optical transfer curve for dynamic range adjustment may also be referred to as tone-mapping (tone-mapping) curves. The floating-point-to-fixed-point conversion is sometimes referred to as quantization, and the fixed-point-to-floating-point conversion is sometimes referred to as dequantization. An optical-electro transfer function in a conventional technology is provided based on a luminance perception model of human eyes. The optical-electro transfer function may be:

$$R' = PQ\_TF(\max(0, \min(R/10000, 1)))$$

$$G' = PQ\_TF(\max(0, \min(G/10000, 1)))$$

$$B' = PQ\_TF(\max(0, \min(B/10000, 1)))$$

$$PQ\_TF(L) = \left(\frac{c_1 + c_2 L^{m_1}}{1 + c_3 L^{m_1}}\right)^{m_2}, \text{ where } m_1 = 0.1593017578125,$$

$$m_2 = 78.84375, c_1 = 0.8359375, c_2 = 18.8515625, \text{ and } c_3 = 18.6875.$$

A tone-mapping process from a high dynamic range to a low dynamic process causes a change to local luminance of a picture/video. The change of the local luminance causes changes to saturation and color temperature in visual perception of human eyes, and consequently, a visual difference of the picture/video before and after the tone-mapping process is caused.

SUMMARY

This application provides a video signal processing method and apparatus, for resolving a problem of a visual difference that is before and after a tone-mapping process and that is caused by tone-mapping.

According to a first aspect of embodiments of this application, a saturation adjustment method is provided, including: determining a saturation adjustment factor of one color component of a color signal based on at least one saturation adjustment parameter, where the saturation adjustment parameter includes: a reference display device maximum luminance value (RML), a source maximum luminance value (SML), a target display device maximum luminance value (TML), and a saturation adjustment strength (SatR); and adjusting the color component based on a maximum value of a plurality of color components of the color signal and the saturation adjustment factor of the color component.

Compared with the conventional technology, when saturation adjustment is performed on one color signal in a to-be-processed color signal, other components of the signal are considered at the same time. An association between different components is considered, to improve an effect of saturation adjustment.

In one embodiment, the color signal is an RGB signal, and the adjusting the color component based on a maximum value of a plurality of color components of the color signal and the saturation adjustment factor of the color component includes: adjusting one of R, G, and B components based on a maximum value of the red (R), green (G), and blue (B) components in the RGB signal and the saturation adjustment factor corresponding to one of the R, G, and B components.

It should be understood that, the method in this embodiment of this application may also be used in another color space, for example, YCbCr space or YUV space.

In one embodiment, the R, G, and B components are adjusted based on the following formulas:

$$\begin{cases} R_{out} = R_{in} + (\text{MAX}(R_{in}, G_{in}, B_{in}) - R_{in}) \times W_R \\ G_{out} = G_{in} + (\text{MAX}(R_{in}, G_{in}, B_{in}) - G_{in}) \times W_G , \\ B_{out} = B_{in} + (\text{MAX}(R_{in}, G_{in}, B_{in}) - B_{in}) \times W_B \end{cases}$$

where $R_{in}$, $G_{in}$, $B_{in}$ are respectively the R, G, and B components in the RGB signal, MAX( ) is a maximum value obtaining function, $W_R$, $W_G$, $W_B$ are respectively saturation adjustment factors corresponding to the R, G, and B components, and $R_{out}$, $G_{out}$, $B_{out}$ are respectively the adjusted R, G, and B components.

In one embodiment, when saturation adjustment is performed on one color component in the to-be-processed color signal, impact of the maximum value of the plurality of different components on saturation adjustment of the current component is considered at the same time, to improve a processing effect.

In one embodiment, the method further includes: adjusting the R, G, and B components based on a first correction strength factor; and correspondingly, the R, G, and B components are adjusted based on the following formulas:

$$\begin{cases} R_{out} = R_{in} + (\text{MAX}(R_{in}, G_{in}, B_{in}) - R_{in}) \times W_R \times C1 \\ G_{out} = G_{in} + (\text{MAX}(R_{in}, G_{in}, B_{in}) - G_{in}) \times W_G \times C1 , \\ B_{out} = B_{in} + (\text{MAX}(R_{in}, G_{in}, B_{in}) - B_{in}) \times W_B \times C1 \end{cases}$$

where

C1 is the first correction strength factor.

By introducing the correction strength factor, accuracy of saturation adjustment is further improved, and an effect of saturation adjustment is improved.

In one embodiment, the first correction strength factor is obtained based on decoded metadata, or is calculated based on information carried in the metadata.

In one embodiment, the color signal is a to-be-displayed signal after dynamic range adjustment is performed.

In one embodiment, the saturation adjustment factor is obtained based on the following formula:

$$W_N = \begin{cases} SatR + \dfrac{(1 - SatR) \times (N_{in} - RML)}{(SML - RML)}, & N_{in} \geq RML \\ \dfrac{SatR \times (N_{in} - RML)}{(SML - RML)}, & RML > N_{in} \geq TML \\ 0, & \text{other} \end{cases}$$

where $N_{in}$ is one of $R_{in}$, $G_{in}$, $B_{in}$, and $W_N$ is the saturation adjustment factor corresponding to the color component represented by $N_{in}$.

A proper saturation adjustment factor is determined based on an actual to-be-processed color signal and characteristics of a display device. It should be understood that, there may be a plurality of saturation adjustment factor determining methods. This is not limited in this embodiment of this application.

In one embodiment, at least one of the reference display device maximum luminance value, the source maximum luminance value, and the saturation adjustment strength is determined based on a preset value, or at least one of the reference display device maximum luminance value, the source maximum luminance value, and the saturation adjustment strength is determined based on the decoded metadata.

In one embodiment, the saturation adjustment strength is 0.8.

In one embodiment, the target display device maximum luminance value is obtained based on a parameter of a target display device.

In one embodiment, when the color signal is a non-RGB signal, before the determining a saturation adjustment factor of one color component of a color signal based on at least one saturation adjustment parameter, the method further includes: converting the non-RGB signal into an RGB signal and using the RGB signal as the color signal.

When this embodiment of this application is directly applied to a signal of another color space, a signal of the another color space may alternatively be converted into an RGB signal for processing.

According to a second aspect of the embodiments of this application, a saturation adjustment apparatus is provided, including: a calculation module, configured to determine a saturation adjustment factor of one color component of a color signal based on at least one saturation adjustment parameter, where the saturation parameter includes: a reference display device maximum luminance value (RML), a source maximum luminance value (SML), a target display device maximum luminance value (TML), and a saturation adjustment strength (SatR); and a conversion module, configured to adjust the color component based on a maximum value of a plurality of color components of the color signal and the saturation adjustment factor of the color component.

In one embodiment, the color signal is an RGB signal, and the conversion module is configured to: adjust one of R, G, and B components based on a maximum value of the red (R), green (G), and blue (B) components in the RGB signal and the saturation adjustment factor corresponding to one of the R, G, and B components.

In one embodiment, the R, G, and B components are adjusted based on the following formulas:

$$\begin{cases} R_{out} = R_{in} + (\text{MAX}(R_{in}, G_{in}, B_{in}) - R_{in}) \times W_R \\ G_{out} = G_{in} + (\text{MAX}(R_{in}, G_{in}, B_{in}) - G_{in}) \times W_G , \\ B_{out} = B_{in} + (\text{MAX}(R_{in}, G_{in}, B_{in}) - B_{in}) \times W_B \end{cases}$$

where $R_{in}$, $G_{in}$, $B_{in}$ are respectively the R, G, and B components in the RGB signal, MAX( ) is a maximum value obtaining function, $W_R$, $W_G$, $W_B$ are respectively saturation adjustment factors corresponding to the R, G, and B components, and $R_{out}$, $G_{out}$, $B_{out}$ are respectively the adjusted R, G, and B components.

In one embodiment, the conversion module is further configured to: adjust the R, G, and B components based on a first correction strength factor; and correspondingly, the R, G, and B components are adjusted based on the following formulas:

$$\begin{cases} R_{out} = R_{in} + (\text{MAX}(R_{in}, G_{in}, B_{in}) - R_{in}) \times W_R \times C1 \\ G_{out} = G_{in} + (\text{MAX}(R_{in}, G_{in}, B_{in}) - G_{in}) \times W_G \times C1 \\ B_{out} = B_{in} + (\text{MAX}(R_{in}, G_{in}, B_{in}) - B_{in}) \times W_B \times C1 \end{cases}$$

where

C1 is the first correction strength factor.

In one embodiment, the first correction strength factor is obtained based on decoded metadata, or is calculated based on information carried in the metadata.

In one embodiment, the color signal is a to-be-displayed signal after dynamic range adjustment is performed.

In one embodiment, the saturation adjustment factor is obtained based on the following formula:

$$W_N = \begin{cases} SatR + \dfrac{(1 - SatR) \times (N_{in} - RML)}{(SML - RML)}, & N_{in} \geq RML \\ \dfrac{SatR \times (N_{in} - RML)}{(SML - RML)}, & RML > N_{in} \geq TML \\ 0, & \text{other} \end{cases}$$

where $N_{in}$ is one of $R_{in}$, $G_{in}$, $B_{in}$, and $W_N$ is the saturation adjustment factor corresponding to the color component represented by $N_{in}$.

In one embodiment, at least one of the reference display device maximum luminance value, the source maximum luminance value, and the saturation adjustment strength is determined based on a preset value, or at least one of the reference display device maximum luminance value, the source maximum luminance value, and the saturation adjustment strength is determined based on the decoded metadata.

In one embodiment, the saturation adjustment strength is 0.8.

In one embodiment, the target display device maximum luminance value is obtained based on a parameter of a target display device.

In one embodiment, when the color signal is a non-RGB signal, the calculation module is further configured to: convert the non-RGB signal into an RGB signal and use the RGB signal as the color signal.

According to a third aspect of the embodiments of this application, a chrominance adjustment method is provided, including: determining a color adjustment coefficient of a chrominance component of a color signal based on a reference display device maximum luminance value (RML) and/or a source maximum luminance value (SML); and adjusting the chrominance component of the color signal based on the color adjustment coefficient.

In this embodiment of this application, the color adjustment coefficient of the color signal is determined based on characteristics of a reference display device and/or a signal source, so that a better chrominance component adjustment effect can be achieved.

In one embodiment, the color adjustment coefficient is obtained based on the following formula:

$$S = \begin{cases} B - C2 \times SatR1 \times f\left(\dfrac{(Y_{in} - A \times RML)}{(RML - A \times RML)}\right), & RML > Y_{in} > A \times RML \\ B - C2 \times SatR1, & Y_{in} \geq RML \end{cases}$$

where

S is the color adjustment coefficient, A is an adjustment range coefficient, B is a strength range coefficient, C2 is a second correction strength factor, $Y_{in}$ is a luminance component value of the color signal, f(x) is a monotonically increasing function when x is in an interval 0 to 1, and SatR1 is a first saturation adjustment coefficient.

For example, the foregoing formula may be $$S = \begin{cases} B - C2 \times SatR1 \times \dfrac{(Y_{in} - A \times RML)}{(RML - A \times RML)}, & RML > Y_{in} > A \times RML \\ B - C2 \times SatR1, & Y_{in} \geq RML \end{cases}$$

For example, the foregoing formula may be simplified as:

$$S = \begin{cases} 1 - C2 \times SatR1 \times \dfrac{(Y_{in} - A \times RML)}{(RML - A \times RML)}, & RML > Y_{in} > A \times RML \\ 1 - C2 \times SatR1, & Y_{in} \geq RML \end{cases}$$

where
SatR1 is 0.8 or 0.7.

In one embodiment, the color adjustment coefficient is obtained based on the following formula:

$$S = \begin{cases} B - C2 \times SatR1 \times f\left(\dfrac{(Y_{in} - A \times RML)}{(RML - A \times RML)}\right), & RML > Y_{in} > A \times RML \\ B - C2 \times SatR1 - C2 \times \\ SatR2 \times g\left(\dfrac{(Y_{in} - RML)}{(SML - RML)}\right), & Y_{in} \geq RML \end{cases}$$

where g(x) is a monotonically increasing function when x is in an interval 0 to 1, and SatR2 is a second saturation adjustment coefficient.

In one embodiment, at least one of RML, SML, A, B, C2, SatR1, and SatR2 is obtained based on decoded metadata, or is calculated based on information carried in the metadata.

In one embodiment, the reference display device maximum luminance value and/or the source maximum luminance value are/is determined based on a preset value, or determined based on the decoded metadata.

In one embodiment, A is a preset value, and 0<A≤1. For example, A may be 0.1, 0.3, ⅓, 0.4, 0.5, 0.6, ⅔, 0.7, 0.8, or 0.9.

In one embodiment, B is a preset value, and 0<B≤1. For example, B may be 0.1, 0.2, 0.3, 0.4, 0.5, 0.6, 0.7, 0.8, 0.9, or 1.0.

In one embodiment, B is determined based on the source maximum luminance value and a target display device maximum luminance value (TML).

In one embodiment, B is a ratio of SML to TML.

In one embodiment, SatR1 and SatR2 are preset values, 0<SatR1≤1, and 0<SatR2≤1. For example, SatR1 and SatR2 may be 0.3, 0.4, 0.5, 0.6, 0.7, 0.8, or 0.9.

In one embodiment, SatR1+SatR2≤1.

In one embodiment, f(x)=x.

In one embodiment, g(x)=x.

In one embodiment, $f(x)=x^N$, and N>0.

In one embodiment, g(x)=x$^M$, and M>0.

In one embodiment, g(x)=const, and const is a constant. For example, const may be 0, 0.3, 0.4, 0.5, 0.6, 0.7, 0.8, 0.9, or 1.0.

In one embodiment, the chrominance component is adjusted based on the following formulas:

$$C'_b = C_b \cdot S; \text{ and}$$
$$C'_r = C_r \cdot S,$$

where $C_b$, $C_r$ are chrominance components before the color signal is adjusted, and $C_b'$, $C_r'$ are chrominance components after the color signal is adjusted.

According to a fourth aspect of the embodiments of this application, a chrominance adjustment apparatus is provided, including: a calculation module, configured to determine a color adjustment coefficient of a chrominance component of a color signal based on a reference display device maximum luminance value (RML) and/or a source maximum luminance value (SML); and a conversion module, configured to adjust the chrominance component of the color signal based on the color adjustment coefficient.

In one embodiment, the color adjustment coefficient is obtained based on the following formula:

$$S = \begin{cases} B - C2 \times SatR1 \times f\left(\frac{(Y_{in} - A \times RML)}{(RML - A \times RML)}\right), & RML > Y_{in} > A \times RML \\ B - C2 \times SatR1, & Y_{in} \geq RML \end{cases},$$

where

S is the color adjustment coefficient, A is an adjustment range coefficient, B is a strength range coefficient, C2 is a second correction strength factor, $Y_{in}$ is a luminance component value of the color signal, f(x) is a monotonically increasing function when x is in an interval 0 to 1, and SatR1 is a first saturation adjustment coefficient.

For example, the foregoing formula may be:

$$S = \begin{cases} B - C2 \times SatR1 \times \frac{(Y_{in} - A \times RML)}{(RML - A \times RML)}, & RML > Y_{in} > A \times RML \\ B - C2 \times SatR1, & Y_{in} \geq RML \end{cases}$$

For example, the foregoing formula may be simplified as:

$$S = \begin{cases} 1 - C2 \times SatR1 \times \frac{(Y_{in} - A \times RML)}{(RML - A \times RML)}, & RML > Y_{in} > A \times RML \\ 1 - C2 \times SatR1, & Y_{in} \geq RML \end{cases}$$

For example, the foregoing formula may be simplified as: where SatR1 is 0.8 or 0.7.

In one embodiment, the color adjustment coefficient is obtained based on the following formula:

$$S = \begin{cases} B - C2 \times SatR1 \times f\left(\frac{(Y_{in} - A \times RML)}{(RML - A \times RML)}\right), & RML > Y_{in} > A \times RML \\ B - C2 \times SatR1 - C2 \times \\ SatR2 \times g\left(\frac{(Y_{in} - RML)}{(SML - RML)}\right), & Y_{in} \geq RML \end{cases},$$

where g(x) is a monotonically increasing function when x is in an interval 0 to 1, and SatR2 is a second saturation adjustment coefficient.

In one embodiment, at least one of RML, SML, A, B, C2, SatR1, and SatR2 is obtained based on decoded metadata, or is calculated based on information carried in the metadata.

In one embodiment, the reference display device maximum luminance value and/or the source maximum luminance value are/is determined based on a preset value, or determined based on the decoded metadata.

In one embodiment, A is a preset value, and 0<A≤1. For example, A may be 0.1, 0.3, ⅓, 0.4, 0.5, 0.6, ⅔, 0.7, 0.8, or 0.9.

In one embodiment, B is a preset value, and 0<B≤1. For example, B may be 0.1, 0.2, 0.3, 0.4, 0.5, 0.6, 0.7, 0.8, 0.9, or 1.0.

In one embodiment, B is determined based on the source maximum luminance value and a target display device maximum luminance value (TML).

In one embodiment, B is a ratio of SML to TML.

In one embodiment, SatR1 and SatR2 are preset values, 0<SatR1≤1, and 0<SatR2≤1. For example, SatR1 and SatR2 may be 0.3, 0.4, 0.5, 0.6, 0.7, 0.8, or 0.9.

In one embodiment, SatR1+SatR2≤1.

In one embodiment, f(x)=x.

In one embodiment, g(x)=x.

In one embodiment, f(x)=x$^N$, and N>0.

In one embodiment, g(x)=x$^M$, and M>0.

In one embodiment, g(x)=const, and const is a constant. For example, const may be 0, 0.3, 0.4, 0.5, 0.6, 0.7, 0.8, 0.9, or 1.0.

In one embodiment, the chrominance component is adjusted based on the following formulas:

$$C'_b = C_b \cdot S; \text{ and}$$
$$C'_r = C_r \cdot S,$$

where $C_b$, $C_r$ are chrominance components before the color signal is adjusted, and $C_b'$, $C_r'$ are chrominance components after the color signal is adjusted.

According to a fifth aspect of the embodiments of this application, a picture processing device is provided, including: a non-volatile memory and a processor that are coupled to each other, where the processor invokes program code stored in the memory, to perform the method according to the first aspect or the third aspect.

According to a sixth aspect of the embodiments of this application, a computer-readable storage medium is provided. The computer-readable storage medium stores a computer program. When the computer program is run on a processor, the method in the first aspect or the third aspect is implemented.

According to a seventh aspect of the embodiments of this application, a video signal processing apparatus is provided. The apparatus includes a processor and a memory. The memory is configured to store necessary instructions and data, and the processor invokes the instructions in the memory to implement the method in the first aspect or the third aspect.

According to an eighth aspect of the embodiments of this application, a computer program product is provided, including a computer program. When the computer program is executed on a computer or a processor, the computer or the processor is enabled to implement the method in the first aspect or the third aspect.

It should be understood that, the technical solutions of the second, and fourth to eighth aspects of this application are consistent with the technical solutions of the first and third aspects of this application. Beneficial effects obtained in the feasible implementations are similar. Details are not described again.

BRIEF DESCRIPTION OF DRAWINGS

FIG. 1-*a* is a schematic diagram of an example of a PQ EOTF curve according to an embodiment of this application;

FIG. 1-*b* is a schematic diagram of an example of a PQ EOTF$^{-1}$ curve according to an embodiment of this application;

FIG. 2-*a* is a schematic diagram of an example of an HLG OETF curve according to an embodiment of this application;

FIG. 2-*b* is a schematic diagram of an example of an HLG OETF$^{-1}$ curve according to an embodiment of this application;

FIG. 3-*a* is a schematic diagram of an architecture of an example of a video signal processing system according to an embodiment of this application;

FIG. 3-*b* is a schematic diagram of an architecture of an example of another video signal processing system according to an embodiment of this application;

FIG. 3-*c* is a schematic diagram of a structure of an example of a video signal processing apparatus according to an embodiment of this application;

FIG. 4 is a schematic diagram of a system architecture to which picture signal conversion is applied according to an embodiment of this application;

DESCRIPTION OF EMBODIMENTS

Figure 5:
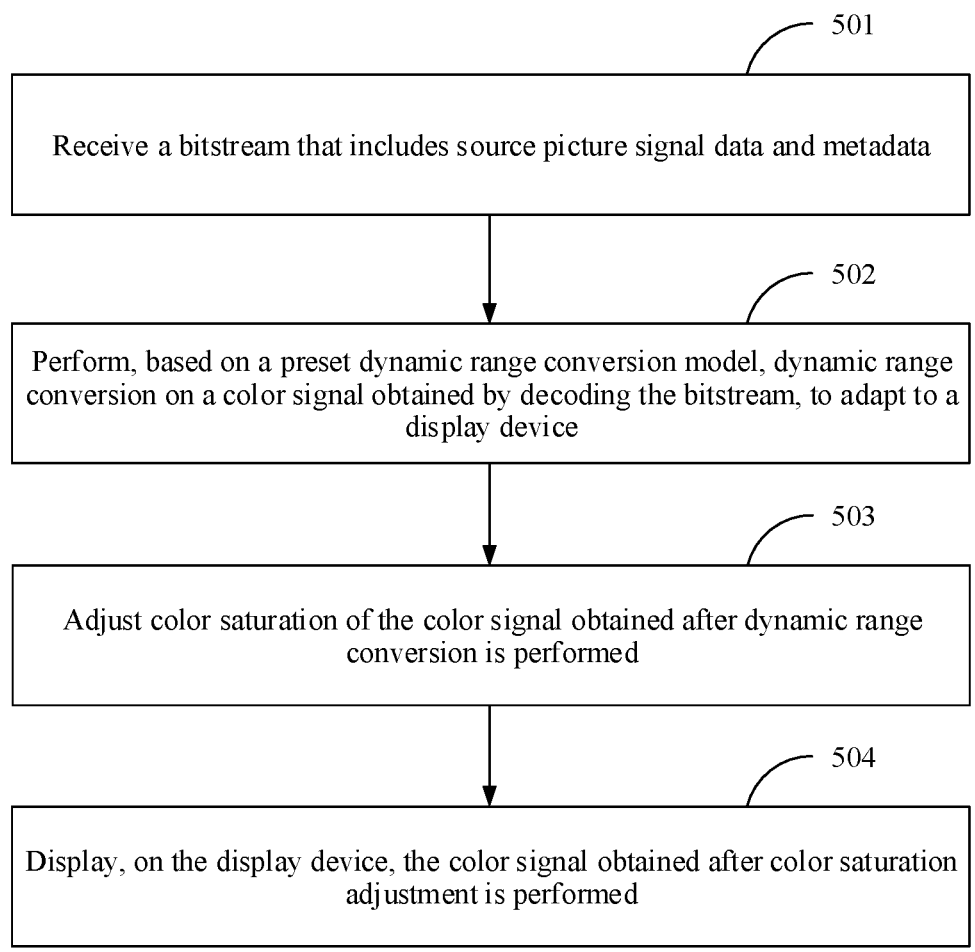
FIG. 5 is a schematic flowchart of an example of a video signal processing method according to an embodiment of this application.

To make the objectives, technical solutions, and advantages of this application clearer, the following further describes this application in detail with reference to the accompanying drawings The term "at least one" in this application means one or more, namely, including one, two, three, or more, and the term "a plurality of" means two or more, namely, including two, three, or more.

For ease of understanding of embodiments of this application, some concepts or terms in embodiments of this application are first described.

A color value is a value corresponding to a particular color component (for example, R, G, B, or Y) of a picture.

A digital code value is a digital expression value of a picture signal, and the digital code value is used to represent a nonlinear color value.

A linear color value is in direct proportion to light intensity, needs to be normalized to [0, 1] in an optional case, and is abbreviated as E.

A nonlinear color value is a normalized digital expression value of picture information, is in direct proportion to a digital code value, needs to be normalized to [0, 1] in an optional case, and is abbreviated as E'.

An electro-optical transfer function (EOTF) describes a relationship of conversion from a nonlinear color value to a linear color value.

An optical-electro transfer function (OETF) describes a relationship of conversion from a linear color value to a nonlinear color value.

Metadata is data that is carried in a video signal and that describes video source information.

Dynamic metadata is metadata associated with each frame of picture, and the metadata changes with pictures.

Static metadata is metadata associated with a picture sequence, and the metadata remains unchanged in the picture sequence.

A luminance signal (luma) represents a combination of nonlinear primary color signals, and has a symbol of Y'.

Luminance mapping is mapping from luminance of a source picture to luminance of a target system.

Display adaptation is to process a video signal to adapt to a display property of a target display.

A source picture is a picture that is input in an HDR pre-processing stage.

A mastering display is a reference display used when a video signal is edited and produced, and is used to determine editing and producing effects of a video.

A linear scene light signal is an HDR video signal using content as scene light in an HDR video technology, is scene light captured by a camera/lens sensor, and is generally a relative value. HLG coding is performed on the linear scene light signal to obtain an HLG signal. The HLG signal is a scene light signal. The HLG signal is nonlinear. The scene light signal generally needs to be converted into a display light signal through OOTF, to be displayed on a display device.

A linear display light signal is an HDR video signal using content as display light in an HDR video technology, is display light emitted by a display device, and is generally an absolute value in a unit of nit. PQ coding is performed on the linear display light signal to obtain a PQ signal, the PQ signal is a display light signal, and the PQ signal is a nonlinear signal. The display light signal is generally displayed on the display device based on absolute luminance thereof.

An opto-optical transfer curve (OOTF) is a curve used to convert one light signal into another light signal in a video technology.

A dynamic range is a ratio of highest luminance to lowest luminance of a video signal.

Luma-chroma-chroma (LCC) is three components of a video signal in which luminance and chrominance are separated.

A perceptual quantizer (PQ) is an HDR standard, and is also an HDR conversion equation. The PQ is determined based on a visual capability of a person. A video signal displayed on a display device is generally a video signal in a PQ coding format.

A PQ EOTF curve is used to convert, into a linear light signal, an electrical signal on which PQ coding has been performed, and a unit is nit. A conversion formula is:

$$PQ\_EOTF(E') = 10000 \left( \frac{\max\left[(E'^{1/m_2} - c_1), 0\right]}{c_2 - c_3 E'^{1/m_2}} \right)^{1/m_1}.$$

E' is an input electrical signal, and has a value range of [0, 1], and fixed parameter values are:

$$m1 = 2610/16384 = 0.1593017578125;$$
$$m2 = 2523/4096 \times 128 = 78.84375;$$
$$c1 = 3424/4096 = 0.8359375 = c3 - c2 + 1;$$
$$c2 = 2413/4096 \times 32 = 18.8515625; \text{ and}$$
$$c3 = 2392/4096 \times 32 = 18.6875.$$

The PQ EOTF curve is shown in FIG. 1-*a*: An input is an electrical signal in a range [0, 1], and an output is a linear optical signal with [0, 10000] nits.

A PQ EOTF$^{-1}$ curve is an inverse curve of the PQ EOTF curve, and a physical meaning of the PQ EOTF$^{-1}$ curve is to convert the linear optical signal with [0, 10000] nits into an electrical signal on which PQ coding is performed; and a conversion formula is:

$$PQ\_EOTF^{-1}(E) = \left( \frac{c_1 + c_2(E/10000)^{m_1}}{1 + c_3(E/10000)^{m_1}} \right)^{m_2}.$$

The PQ EOTF$^{-1}$ curve is shown in FIG. 1-*b*: An input is a linear optical signal with [0, 10000] nits, and an output is an electrical signal in a range [0, 1].

A color gamut is a color range included in color space, and related color gamut standards include BT.709 and BT.2020.

Hybrid log gamma (HLG) is an HDR standard. A video signal captured by a camera, a video camera, a picture sensor, or another type of picture capturing device is a video signal in an HLG coding format.

An HLG OETF curve is a curve used to perform HLG coding on a linear scene light signal to convert the linear scene light signal into a nonlinear electrical signal. A conversion formula is:

$$E' = \begin{cases} \sqrt{3*E} & 0 \le E \le 1/12 \\ a*\ln(12*E - b) + c & 1/12 < E \le 1 \end{cases}.$$

E is an input linear scene light signal, and has a range of [0, 1], and E' is an output nonlinear electrical signal, and has a range of [0, 1].

Fixed parameters are as follows: a=0.17883277, b=0.28466892, c=0.55991073. FIG. 2-a is a diagram of an example of the HLG OETF curve.

An HLG OETF$^{-1}$ curve is an inverse curve of the HLG OETF curve, and converts a nonlinear electrical signal on which HLG coding is performed into a linear scene optical signal. For example, a conversion formula is as follows:

$$E = \begin{cases} E'^2/3, & 0 \le E' \le 1/2 \\ \left( \exp\left(\frac{(E'-c)}{a}\right) + b \right) / 12, & 1/2 < E' \le 1 \end{cases}.$$

FIG. 2-*b* is a diagram of an example of the HLG OETF$^{-1}$ curve. E is an input nonlinear electrical signal and has a range of [0, 1]; and E is an output linear scene optical signal and has a range of [0, 1].

Linear space in this application is space in which a linear light signal is located.

Nonlinear space in this application is space in which a signal obtained after a linear light signal is converted by using a nonlinear curve is located. Common nonlinear curves of the HDR include the PQ EOTF-1 curve, the HLG OETF curve, and the like, and a common nonlinear curve of the SDR includes a gamma curve. Generally, it is considered that a signal obtained after a linear light signal is coded by using the nonlinear curve is visually linear relative to human eyes. It should be understood that the nonlinear space may be considered as visual linear space.

Gamma correction is a method for performing nonlinear hue editing on a picture. A dark-colored part and a light-colored part in the picture signal can be detected, and proportions of the dark-colored part and the light-colored part are increased, to improve a picture contrast effect. Optical-electro transfer features of existing screens, photographic films, and many electronic cameras may be nonlinear. A relationship between outputs and inputs of these nonlinear components may be represented by using a power function, namely: output=(input)$^\gamma$.

Because a visual system of the human being is nonlinear, and the human being perceives a visual stimulation through comparison, nonlinear conversion is performed on a color value output by a device. Stimulation is enhanced by the outside world at a particular proportion, and for the human being, such stimulation evenly increases. Therefore, for perception of the human being, a physical quantity increasing in a geometric progression is even. To display input colors based on a visual law of the human being, nonlinear conversion in the form of the power function is needed, to convert a linear color value into a nonlinear color value. A value γ of gamma may be determined based on an optical-electro transfer curve of color space.

For the color space, colors may be different perceptions of eyes for light rays having different frequencies, or may represent objectively existing light having different frequencies. The color space is a color range defined by a coordinate system that is established by people to represent colors. Color gamut and a color model define color space together. The color model is an abstract mathematical model that represents a color by using a group of color components. The color model may be, for example, a red green blue (RGB) mode and a printing cyan magenta yellow black (CMYK) mode. The color gamut is a sum of colors that can be generated by a system. For example, Adobe RGB and sRGB are different color space based on an RGB model.

Each device such as a display or a printer has color space, and can generate colors only in color gamut of the device. When a picture is transferred from one device to another device, because the device converts the picture based on the color space of the device and displays RGB or CMYK, colors of the picture may change on different devices.

The RGB space in the embodiments of this application is space in which a video signal is quantitatively represented by luminance of red, green, and blue. YCC space is color space representing separation of luminance and chrominance in this application. Three components of a YCC-space video signal respectively represent luminance-chrominance-chrominance. Common YCC-space video signals include YUV, YCbCr, ICtCp, and the like.

An embodiment of this application provides a video signal processing method and apparatus. A saturation change generated by tone-mapping performed on a to-be-processed video signal can be compensated for based on this method, to alleviate a tone shift phenomenon.

The following describes in detail embodiments of this application with reference to the accompanying drawings. First, a video signal processing system provided in embodiments of this application is described. Then, a video signal processing apparatus provided in embodiments of this application is described. Finally, one embodiment of a video signal processing method provided in embodiments of this application is described.

As shown in FIG. 3-a, a video signal processing system 100 provided in embodiments of this application may include a signal source 101 and a video signal processing apparatus 102 that is provided in embodiments of this application. The signal source 101 is configured to input a to-be-processed video signal to the video signal processing apparatus 102. The video signal processing apparatus 102 is configured to process the to-be-processed video signal according to the video signal processing method provided in embodiments of this application. In an optional case, the video signal processing apparatus 102 shown in FIG. 3-a may have a display function. Then, the video signal processing system 100 provided in embodiments of this application may further display a video signal on which video signal processing has been performed. In this case, the processed video signal does not need to be output to a display device. In this case, the video signal processing apparatus 102 may be a display device such as a television or a display having a video signal processing function.

In a structure of another video signal processing system 100 shown in FIG. 3-b, the system 100 further includes a display device 103. The display device 103 may be a device having a display function such as a television or a display, or may be a display. The display device 103 is configured to receive a video signal transmitted by the video signal processing apparatus 102 and display the received video signal. The video signal processing apparatus 102 herein may be a play device such as a set top box.

In the foregoing example video signal processing system 100, if the to-be-processed video signal generated by the video signal source 101 is an HDR signal on which no RGB-space luminance mapping is performed, the signal may be processed by the video signal processing apparatus 102 by using the video signal processing method provided in embodiments of this application. In this case, the video signal processing apparatus 102 may have an RGB-space luminance mapping function for an HDR signal. If the to-be-processed video signal generated by the video signal source 101 may be a video signal on which RGB-space luminance mapping has been performed, for example, may be a video signal on which the RGB-space luminance mapping has been performed and color space conversion to nonlinear NTFL1 space has been performed in embodiments of this application, the video signal processing apparatus 102 performs color saturation compensation on the signal. In embodiments of this application, the video signal may be converted from YUV space to RGB space or from RGB space to YUV space by using a standard conversion process in the conventional technology.

In one embodiment, the video signal processing apparatus 102 provided in embodiments of this application may be in a structure shown in FIG. 3-c. It can be learned that the video signal processing apparatus 102 may include a processing unit 301. The processing unit 301 may be configured to implement operations in the video signal processing method provided in embodiments of this application, for example, an operation of determining a saturation adjustment factor corresponding to an initial luminance value of a to-be-processed video signal, and a operation of adjusting a chrominance value of the to-be-processed video signal based on the saturation adjustment factor.

For example, the video signal processing apparatus 102 may further include a storage unit 302. The storage unit 302 stores a computer program, instructions, and data. The storage unit 302 may be coupled to the processing unit 301, and is configured to support the processing unit 301 in invoking the computer program and the instructions in the storage unit 302, to implement the operations in the video signal processing method provided in embodiments of this application. In addition, the storage unit 302 may be further configured to store data. In embodiments of this application, coupling is interconnection implemented in a particular manner, and includes direct connection or indirect connection implemented by using another device. For example, coupling may be implemented through various interfaces, transmission lines, or buses.

For example, the video signal processing apparatus 102 may further include a sending unit 303 and/or a receiving unit 304. The sending unit 303 may be configured to output the processed video signal. The receiving unit 304 may receive the to-be-processed video signal generated by the video signal source 101. For example, the sending unit 303 and/or the receiving unit 304 may be a video signal interface such as a high definition multimedia interface (HDMI).

For example, the video signal processing apparatus 102 may further include a display unit 305 such as a display, configured to display the processed video signal.

FIG. 4 shows an example of a system architecture to which the embodiments of this application are applied. In one embodiment, a front-end device (including a video acquisition and production device) completes production of high dynamic HDR content, and transmits video source data (picture information) and metadata (dynamic metadata and/or static metadata) to a display end by using a transport layer. Based on display capabilities (SDR or HDR) of different display devices, the display end converts the received video source data (in some embodiments, in combination with information provided by the metadata) into a display picture adapted to the display device. It should be understood that, "low dynamic" in "low dynamic HDR" and "low dynamic SDR" in FIG. 4 is relative to high dynamic HDR content generated by the front end. It should be further understood that, in different embodiments, the display device may have a display capability with a higher dynamic range than HDR content generated by the front end. A display adaptation process of the display device may also be applied to this system architecture. This is not limited in this application.

For example, a dynamic range conversion module in the embodiments of this application may exist in a set-top box, a television display, a mobile terminal display, and a video conversion device such as a network live broadcast device or a network video application device. In one embodiment, the module may exist in a form of a chip in the set-top box, the television display, and the mobile terminal display, and may exist in a form of a software program in the video conversion device such as the network live broadcast device or the network video application device.

FIG. 5 is a schematic flowchart of a picture signal conversion processing method according to an embodiment of this application. The picture signal conversion processing method in the embodiment shown in FIG. 5 may include at least the following operations.

S501: Receive a bitstream that includes source picture signal data and metadata.

Usually, both the source picture signal data (an HDR video signal) and the metadata are transmitted in a form of the bitstream. The bitstream is obtained by encoding picture data and auxiliary information at a video content production end, and is restored to the source picture signal data and the metadata with loss or losslessly through decoding at a display end. The source picture signal data may be pixel data, and the metadata may include a format of video source data and various parameters related to HDR video processing, for example, parameters in a dynamic range conversion model.

It should be understood that, a format of the source picture signal data is not limited in this embodiment of this application. For example, the source picture signal data may be data in YUV color space, or may be data in RGB color space, or may be data of 8 bits, or may be data of 10 bits, or data of 12 bits.

It should be further understood that, in this embodiment of this application, a format of the metadata is not limited. For example, the metadata may be standard ST2094-40 including histogram information and tone-mapping curve parameter information, or may be standard ST2094-10 including the tone-mapping curve parameter information. The metadata may be dynamic metadata, or may be static metadata, or include both static metadata and dynamic metadata, In this embodiment of this application, the received source picture signal data may be an optical signal, or may be an electrical signal. This is not limited in this application.

S502: Perform, based on a preset dynamic range conversion model, dynamic range conversion (tone-mapping) on a color signal obtained by decoding the bitstream, to adapt to a display device.

In this embodiment of this application, a dynamic range conversion model and a corresponding tone-mapping processing method in the conventional technology may be applied. This is not limited. For example, the dynamic range conversion model, which may also be referred to as a dynamic range conversion function, a dynamic range conversion curve, an optical-electro conversion function, or the like, may be:

$$L' = F(L) = a \times \left( \frac{p \times L^n}{(k_1 \times p - k_2) \times L^n + k_3} \right)^m + b,$$

where

L is a color value of a color component of the to-be-processed color signal, L' is a color value of the processed color component, that is, the to-be-displayed color signal, $k_1$, $k_2$, $k_3$, a, b, m, n, and p are model parameters.

S503: Adjust color saturation of the color signal obtained after dynamic range conversion is performed.

One embodiment is described in detail with reference to FIG. 6.

S504: Display, on the display device, the color signal obtained after color saturation adjustment is performed.

It should be understood that, after the color signal after color saturation adjustment is performed is obtained and before display, one or more picture processing processes such as color gamut conversion, noise reduction processing, and sharpening processing may be further performed on the color signal obtained after color saturation adjustment is performed. This is not limited in this application.

Figure 6:
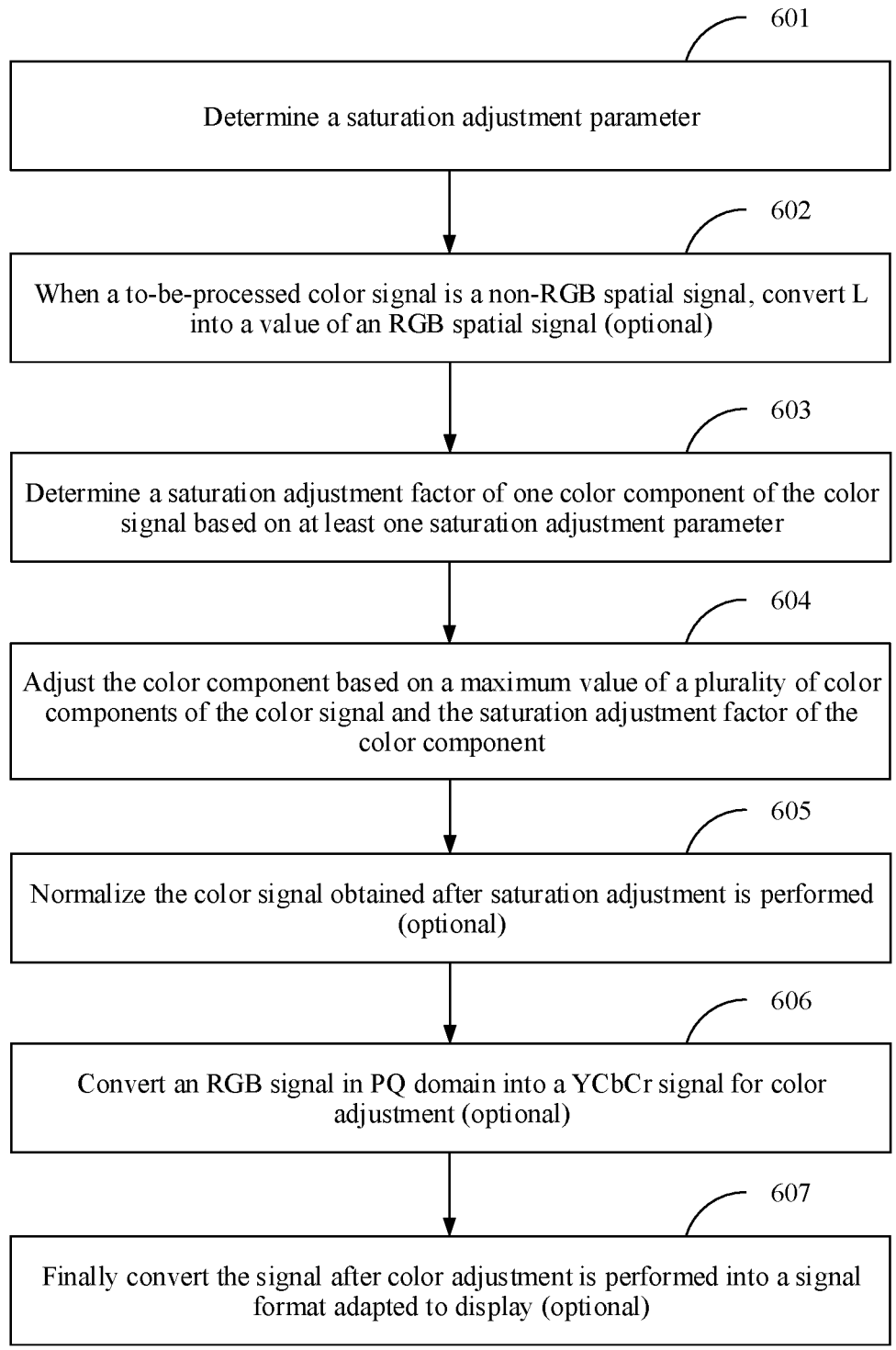
FIG. 6 is a schematic flowchart of an example of another video signal processing method according to an embodiment of this application.

FIG. 6 is a schematic flowchart of another picture signal conversion processing method according to an embodiment of this application. The embodiment shown in FIG. 6 describes one embodiment of operation S503 in FIG. 5, and may include at least the following operations.

S601: Determine a saturation adjustment parameter.

In this embodiment of this application, the saturation adjustment parameter is used to determine a saturation adjustment factor. For example, the saturation adjustment parameter includes: a reference display device maximum luminance value, a source maximum luminance value, a target display device maximum luminance value, and a saturation adjustment strength. Manners of determining the saturation adjustment parameters are described.

Reference display device maximum luminance value (RML):

A reference display device, for example, is the mastering monitor mentioned above. In one embodiment, the maximum luminance value of the reference display device is a preset value known to both a video content production end and a display end. In another embodiment, the maximum luminance value of the reference display device is transmitted to the display end in a form of static metadata or dynamic metadata, and the display end learns of the value by decoding the metadata.

It should be understood that, some reference display devices may dynamically adjust maximum luminance values, and may adjust different maximum luminance values corresponding to different pixels. Therefore, this embodiment of this application is not limited to using same RML for all pixels.

Source Maximum Luminance Value (SML):

The source maximum luminance value is a maximum luminance value of a source picture signal. In one embodiment, the source maximum luminance value is a preset value known to both the video content production end and the display end. For example, the source maximum luminance value may be 10000 nits. In another embodiment, the source maximum luminance value is transmitted to the display end in a form of static metadata or dynamic metadata, and the display end learns the value by decoding the metadata. For example, In one embodiment, a value of the SML is taken from a maximum value of maximum color values of all valid pixels of the source picture signal.

Target Display Device Maximum Luminance Value (TML):

A target display device is a display device in operation S504 in this embodiment of this application. A maximum display capability of the target display device may be obtained based on a parameter of the target display device, or obtained based on product information provided by a production manufacturer. A minimum display capability of the target display device is usually 0 nit, or may be 1 nit. This is not limited in this application.

It should be understood that, similar to the RML, this embodiment of this application is not limited to using same TML for all pixels.

Saturation Adjustment Strength (SatR):

The saturation adjustment strength reflects an adjustment strength of the video content production end for saturation. In one embodiment, the saturation adjustment strength is a preset value known to both the video content production end and the display end. In another embodiment, the saturation adjustment strength is transmitted to the display end in a form of static metadata or dynamic metadata, and the display end learns the value by decoding the metadata. For example, SatR may be 0.8.

It should be understood that, this embodiment of this application is not limited to using same SatR for all pixels.

S602: In one embodiment, when the to-be-processed color signal (that is, the color signal obtained after dynamic range conversion is performed) is a non-RGB spatial signal, convert L into a value of an RGB spatial signal, where correspondingly, L' is also a value of the RGB spatial signal.

It should be understood that, this embodiment of this application may also be applied to adjustment of another color space. This is not limited.

S603: Determine a saturation adjustment factor of one color component of the color signal based on at least one saturation adjustment parameter.

It may be assumed that $N_{in}$ represents L in operation S502. For example, $N_{in}$ may be any one of $R_{in}$, $G_{in}$, and $B_{in}$. $W_N$ is the saturation adjustment factor of the color component represented by $N_{in}$. To be specific, the saturation adjustment factor of the R component ($R_{in}$) of the to-be-processed color signal is $W_R$, the saturation adjustment factor of the G component ($G_{in}$) of the to-be-processed color signal is $W_G$, and the saturation adjustment factor of the B component ($B_{in}$) of the to-be-processed color signal is $W_B$.

In one embodiment, the saturation adjustment factor is obtained based on the following formula:

$$W_N = \begin{cases} SatR + \frac{(1 - SatR) \times (N_{in} - RML)}{(SML - RML)}, & N_{in} \geq RML \\ \frac{SatR \times (N_{in} - RML)}{(SML - RML)}, & RML > N_{in} \geq TML \\ 0, & other \end{cases}.$$

The saturation adjustment factor may alternatively be determined by using another formula. This is not limited in this embodiment of this application. For example, a manner of determining the saturation adjustment factor further includes:

Example 1

$$W_N = \begin{cases} SatR + \frac{(1 - SatR) \times (N_{in} - RML)}{(SML - RML)}, & N_{in} \geq RML \\ \frac{SatR \times (N_{in} - TML)}{(RML - TML)}, & RML > N_{in} \geq TML \\ 0, & other \end{cases}.$$

Example 2

$$W_N = \begin{cases} SatR + (1 - SatR) \times f1(N_{in}), & N_{in} \geq RML \\ SatR \times f2(N_{in}), & RML > N_{in} \geq TML \\ 0, & other \end{cases},$$

where
$f1(N_{in})$ is a continuous curve passing through (RML, 0) and (SML, 1), and $f2(N_{in})$ is a continuous curve passing through (TML, 0) and (RML, 1).

Example 3

$$W_N = \begin{cases} SatR + (1 - SatR) \times f1(N_{in}), & N_{in} \geq RML \\ SatR \times f2(N_{in}), & RML > N_{in} \geq TML \end{cases},$$

where
$f1(N_{in})$ is a continuous curve passing through (RML, 0), and $f2(N_{in})$ is a continuous curve passing through (RML, 1).

Example 4

$$W_N = \begin{cases} f1(N_{in}), & N_{in} \geq RML \\ f2(N_{in}), & RML > N_{in} \geq TML \\ 0, & other \end{cases},$$

where
$f1(N_{in})$ is a continuous monotonically increasing curve passing through (RML, SatR), and $f2(N_{in})$ is a continuous monotonically increasing curve passing through (TML, 0) and (RML, SatR).

Example 5

$$W_N = \begin{cases} f1(N_{in}), & N_{in} \geq RML \\ f2(N_{in}), & other \end{cases},$$

where
$f1(N_{in})$ is a continuous monotonically increasing curve passing through (RML, SatR), $f2(N_{in})$ is a continuous monotonically increasing curve passing through (RML, SatR), and $f1(N_{in})$ is different from $f2(N_{in})$.

Example 6

$$W_N = \begin{cases} f1(N_{in}), & N_{in} \geq RML \\ 0, & other \end{cases},$$

where
$f1(N_{in})$ is a continuous monotonically increasing curve passing through (RML, SatR).

Example 7

$$W_N = \begin{cases} SatR, & N_{in} \geq RML \\ f2(N_{in}), & other \end{cases},$$

where
f2($N_{in}$) is a continuous monotonically increasing curve passing through (RML, SatR).

Example 8

$$W_N = \begin{cases} SatR, & N_{in} \geq RML \\ 0, & other \end{cases}.$$

It should be understood that, the function f1( ) and/or the function f2( ) in the foregoing Examples 2 to 7 are not limited in this embodiment of this application. For example, Example 1 may be used as one embodiment of any determining manner in Examples 2 to 7. For example, Example 1 is equivalent to Example 2 when $$f1(N_{in}) = \frac{N_{in} - RML}{SML - RML}, \text{ and}$$

$$f2(N_{in}) = \frac{N_{in} - TML}{RML - TML}$$

in Example 2. In addition, clearly, this function satisfies the following condition: f1($N_{in}$) is a continuous curve passing through (RML, 0) and (SML, 1), and f2 ($N_{in}$) is a continuous curve passing through (TML, 0) and (RML, 1).

S604: Adjust the color component based on a maximum value of a plurality of color components of the color signal and the saturation adjustment factor of the color component.

When the color signal is an RGB signal, this operation is adjusting one of R, G, and B components based on a maximum value of the red (R), green (G), and blue (B) components in the RGB signal and the saturation adjustment factor corresponding to one of the R, G, and B components.

In one embodiment, the R, G, and B components are adjusted based on the following formulas:

$$\begin{cases} R_{out} = R_{in} + (MAX(R_{in}, G_{in}, B_{in}) - R_{in}) \times W_R \\ G_{out} = G_{in} + (MAX(R_{in}, G_{in}, B_{in}) - G_{in}) \times W_G \\ B_{out} = B_{in} + (MAX(R_{in}, G_{in}, B_{in}) - B_{in}) \times W_B \end{cases},$$

where
$R_{in}$, $G_{in}$, $B_{in}$ are respectively the R, G, and B components in the RGB signal, MAX( ) is a maximum value obtaining function, $W_R$, $W_G$, $W_B$ are respectively saturation adjustment factors corresponding to the R, G, and B components, and $R_{out}$, $G_{out}$, $B_{out}$ are respectively the adjusted R, G, and B components.

In another embodiment, the method further includes: adjusting the R, G, and B components based on a first correction strength factor; and correspondingly, the R, G, and B components are adjusted based on the following formulas:

$$\begin{cases} R_{out} = R_{in} + (MAX(R_{in}, G_{in}, B_{in}) - R_{in}) \times W_R \times C1 \\ G_{out} = G_{in} + (MAX(R_{in}, G_{in}, B_{in}) - G_{in}) \times W_G \times C1 \\ B_{out} = B_{in} + (MAX(R_{in}, G_{in}, B_{in}) - B_{in}) \times W_B \times C1 \end{cases},$$

where
C1 is the first correction strength factor.

In one embodiment, the first correction strength factor is obtained based on decoded metadata, that is, a value of the first correction strength factor is carried in the metadata.

In another embodiment, calculation is performed based on information carried in the metadata, to obtain the first correction strength factor.

For example, a syntactic element of color_saturation_gain0 or color_saturation_gain1 in the metadata may be decoded to obtain a value, and then the obtained value is divided by 15, to obtain a value of the first correction strength factor.

S605: In one embodiment, normalize the color signal obtained after saturation adjustment is performed.

To be specific, the RGB signal ($R_{out}$, $G_{out}$, $B_{out}$) in linear domain is normalized. A process of normalization processing is an example, and may be completed based on a process that is of converting into a nonlinear PQ signal value and that is specified by an ST 2084, 2014-SMPTE standard. Details are not described again. In addition, the process of normalization processing is not limited in this embodiment of this application.

S606: In one embodiment convert the RGB signal in PQ domain into a $YC_bC_r$ signal for color adjustment.

It should be understood that the RGB signal in PQ domain may alternatively be converted into a signal in another luminance-chrominance-chrominance format. This is not limited in this embodiment of this application.

For example, the RGB color signal in the Rec. ITU-R BT.2020-2 format may be converted into a color signal in the YCbCr format:

$$\begin{bmatrix} Y \\ C_b \\ C_r \end{bmatrix} = \begin{bmatrix} 0.2627 & 0.6780 & 0.0593 \\ -0.1396 & -0.3604 & 0.5000 \\ 0.5000 & -0.4598 & -0.0402 \end{bmatrix} \cdot \begin{bmatrix} R \\ G \\ B \end{bmatrix}.$$

Then, a color adjustment coefficient is determined based on the target display device maximum luminance value and the saturation adjustment factor.

In one embodiment, the color adjustment coefficient is obtained based on the following formula:

$$S = \begin{cases} 1 - C2 \times SatR \times \frac{(Y_{in} - A \times RML)}{(RML - A \times RML)}, & RML > Y_{in} > A \times RML \\ 1 - C2 \times SatR, & Y_{in} \geq RML \end{cases},$$

where
S is the color adjustment coefficient, A is an adjustment range coefficient, C2 is a second correction strength factor, $Y_{in}$ is a luminance component value of the luminance-chrominance-chrominance signal, and A is a rational number less than 1 and greater than 0.

In another embodiment, the color adjustment coefficient is obtained based on the following formula:

$$S = \begin{cases} \left(\frac{Yorg}{Y_{in}}\right)^{C3}, & A \times RML \geq Y_{in} \\ 1 - C2 \times SatR \times \frac{(Y_{in} - A \times TML)}{(TML - A \times TML)}, & RML > Y_{in} > A \times RML \\ 1 - C2 \times SatR, & Y_{in} \geq RML \end{cases},$$

where
C3 is a third correction strength factor, and Yorg is a value of a Y component of the color signal obtained by decoding the bitstream before tone-mapping is performed.

Manners of obtaining C2 and C3 are similar to the manner of obtaining C1. Details are not described again. A may be determined based on a preset value, or may be determined based on the decoded metadata.

In one embodiment, a value of A is ⅔.

In another embodiment, a set of pixels whose at least two color components are less than or equal to TML is determined from pixels of the RGB signal, a pixel with a largest luminance component value is determined from the pixel set, and the largest luminance value is used as A.

In another embodiment, the color adjustment coefficient is obtained based on the following formula:

$$S = \begin{cases} 1 - C2 \times SatR \times f1(Y_{in}), & TML > Y_{in} \geq A \times TML \\ 1 - C2 \times SatR, & Y_{in} \geq TML \end{cases},$$

where $f1(Y_{in})$ is a continuous curve passing through $(A*TML, 1)$ and $(TML, 1-SatR)$.

For example, $$f1(Y_{in}) = \frac{(Y_{in} - A \times TML)}{(TML - A \times TML)}.$$

To be specific, the foregoing formula for determining the color adjustment coefficient is one embodiment of this implementation.

In some feasible implementations, values of SatR used to determine the saturation adjustment factor and SatR used to determine the color adjustment coefficient may be different. To be specific, before the color adjustment coefficient is determined, SatR may be adjusted. For example, the value of SatR may be adjusted from 0.8 to 1.

After the color adjustment coefficient is determined, a chrominance component of the luminance-chrominance-chrominance signal is adjusted based on the color adjustment coefficient.

For example, the adjusted color signal in the $YC_bC_r$ format is:

$$C_b' = C_b \cdot S; \text{ and}$$
$$C_r' = C_r \cdot S.$$

The luminance component of the color signal in the $YC_bC_r$ format does not need to be adjusted, that is, $Y'=Y_{in}$, $C_b$, $C_r$ are respectively chrominance components of the color signal in the $YC_bC_r$ format before adjustment, and $C_b'$, $C_r'$ are respectively chrominance components of the adjusted color signal in the $YC_bC_r$ format.

It should be understood that the color adjustment coefficient S may also be used to adjust a signal after non-tone-mapping is performed. This is not limited in this application.

S607: In one embodiment, finally convert the signal after color adjustment is performed into a signal format adapted to display.

It should be understood that, in some other embodiments, operations S605 to S607 may be used as part of post-processing of the to-be-displayed signal before operation S504.

Figure 7:
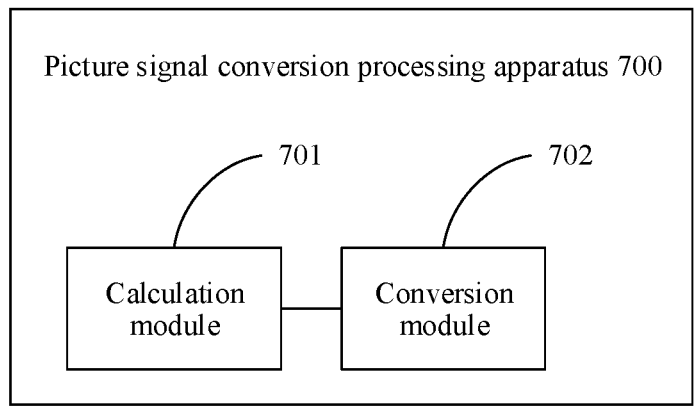
FIG. 7 is a schematic diagram of a structure of an example of a video signal processing apparatus according to an embodiment of this application.

FIG. 7 is a schematic diagram of a structure of a picture signal conversion processing apparatus according to an embodiment of this application. The picture signal conversion processing apparatus provided in this embodiment of the present disclosure may be configured to implement some or all of procedures of the picture signal conversion processing method embodiment described with reference to FIG. 5 or FIG. 6 in the present disclosure. A saturation adjustment apparatus 700 shown in FIG. 7 includes: a calculation module 701, configured to determine a saturation adjustment factor of one color component of a color signal based on at least one saturation adjustment parameter, where the saturation parameter includes: a reference display device maximum luminance value (RML), a source maximum luminance value (SML), a target display device maximum luminance value (TML), and a saturation adjustment strength (SatR); and a conversion module 702, configured to adjust the color component based on a maximum value of a plurality of color components of the color signal and the saturation adjustment factor of the color component.

In one embodiment, the color signal is an RGB signal, and the conversion module 702 is configured to: adjust one of R, G, and B components based on a maximum value of the red (R), green (G), and blue (B) components in the RGB signal and the saturation adjustment factor corresponding to one of the R, G, and B components.

In one embodiment, the R, G, and B components are adjusted based on the following formulas:

$$\begin{cases} R_{out} = R_{in} + (MAX(R_{in}, G_{in}, B_{in}) - R_{in}) \times W_R \\ G_{out} = G_{in} + (MAX(R_{in}, G_{in}, B_{in}) - G_{in}) \times W_G, \\ B_{out} = B_{in} + (MAX(R_{in}, G_{in}, B_{in}) - B_{in}) \times W_B \end{cases}$$

where $R_{in}$, $G_{in}$, $B_{in}$ are respectively the R, G, and B components in the RGB signal, MAX( ) is a maximum value obtaining function, $W_R$, $W_G$, $W_B$ are respectively saturation adjustment factors corresponding to the R, G, and B components, and $R_{out}$, $G_{out}$, $B_{out}$ are respectively the adjusted R, G, and B components.

In one embodiment, the conversion module 702 is further configured to: adjust the R, G, and B components based on a first correction strength factor; and correspondingly, the R, G, and B components are adjusted based on the following formulas:

$$\begin{cases} R_{out} = R_{in} + (MAX(R_{in}, G_{in}, B_{in}) - R_{in}) \times W_R \times C1 \\ G_{out} = G_{in} + (MAX(R_{in}, G_{in}, B_{in}) - G_{in}) \times W_G \times C1, \\ B_{out} = B_{in} + (MAX(R_{in}, G_{in}, B_{in}) - B_{in}) \times W_B \times C1 \end{cases}$$

where

C1 is the first correction strength factor.

In one embodiment, the first correction strength factor is obtained based on decoded metadata, or is calculated based on information carried in the metadata.

In one embodiment, the color signal is a to-be-displayed signal after dynamic range adjustment is performed.

In one embodiment, the saturation adjustment factor is obtained based on the following formula:

$$W_N = \begin{cases} SatR + \frac{(1 - SatR) \times (N_{in} - RML)}{(SML - RML)}, & N_{in} \geq RML \\ \frac{SatR \times (N_{in} - RML)}{(SML - RML)}, & RML > N_{in} \geq TML, \\ 0, & other \end{cases}$$

where $N_{in}$ is one of $R_{in}$, $G_{in}$, $B_{in}$, and $W_N$ is the saturation adjustment factor corresponding to the color component represented by $N_{in}$.

In one embodiment, at least one of the reference display device maximum luminance value, the source maximum luminance value, and the saturation adjustment strength is determined based on a preset value, or at least one of the reference display device maximum luminance value, the source maximum luminance value, and the saturation adjustment strength is determined based on the decoded metadata.

In one embodiment, the saturation adjustment strength is 0.8.

In one embodiment, the target display device maximum luminance value is obtained based on a parameter of a target display device.

In one embodiment, when the color signal is a non-RGB signal, the calculation module is further configured to: convert the non-RGB signal into an RGB signal and use the RGB signal as the color signal.

Figure 8:
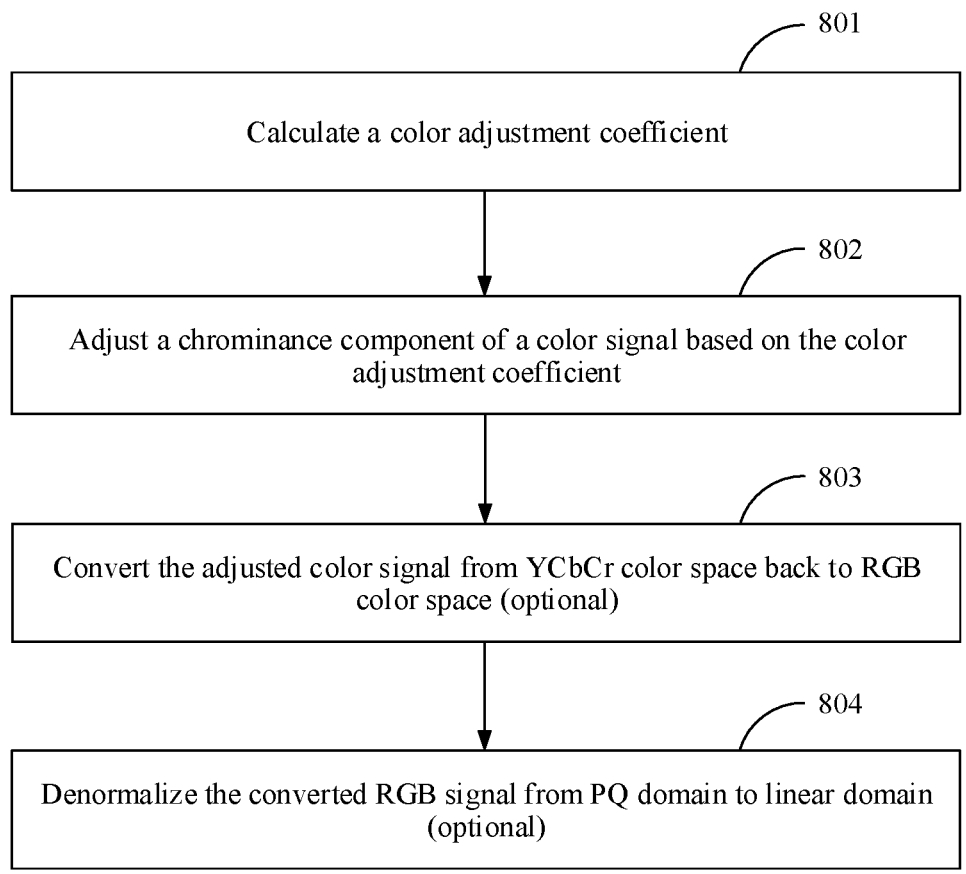
FIG. 8 is a schematic flowchart of an example of still another video signal processing method according to an embodiment of this application.

FIG. 8 is a schematic flowchart of another picture signal conversion processing method according to an embodiment of this application. In one embodiment, FIG. 8 shows a chrominance adjustment method.

It may be assumed that the chrominance adjustment is performed after a tone-mapping operation, a picture signal of a to-be-processed frame is R, G, and B of RGB color space before tone-mapping is performed, and the picture signal of the to-be-processed frame is Rt, Gt, and Bt of the RGB color space after tone-mapping is performed. In this case, a signal that is of $YC_bC_r$ space and that corresponds to the picture signal of the to-be-processed frame before tone-mapping is performed may be obtained based on the following formula:

$$\begin{bmatrix} Y_{in} \\ C_{b\_in} \\ C_{r\_in} \end{bmatrix} = \begin{bmatrix} 0.2627 & 0.6780 & 0.0593 \\ -0.1396 & -0.3604 & 0.5000 \\ 0.5000 & -0.4598 & -0.0402 \end{bmatrix} \cdot \begin{bmatrix} R \\ G \\ B \end{bmatrix},$$

where $Y_{in}$, $C_{b\_in}$, $C_{r\_in}$ are respectively luminance, a first chrominance component, and a second chrominance component of the picture signal of the to-be-processed frame in the $YC_bC_r$ space.

A signal that is of the $YC_bC_r$ space and that corresponds to the picture signal of the to-be-processed frame after tone-mapping is performed may be obtained based on the following formula:

$$\begin{bmatrix} Y \\ C_b \\ C_r \end{bmatrix} = \begin{bmatrix} 0.2627 & 0.6780 & 0.0593 \\ -0.1396 & -0.3604 & 0.5000 \\ 0.5000 & -0.4598 & -0.0402 \end{bmatrix} \cdot \begin{bmatrix} Rt \\ Gt \\ Bt \end{bmatrix},$$

where

Y, $C_b$, $C_r$ are respectively luminance, a first chrominance component, and a second chrominance component of the picture signal of the to-be-processed frame in the $YC_bC_r$ space.

It should be understood that, in this embodiment of this application, color space conversion conforms to a standard of ITU-BT2020. The RGB color signal in the Rec. ITU-R BT.2020-2 format is converted into a color signal in the $YC_bC_r$ format. A conversion method corresponding to another color space may also be applied to this embodiment of this application. This is not limited.

S801: Calculate a color adjustment coefficient.

In one embodiment, a color adjustment coefficient of a chrominance component of a color signal is determined based on a reference display device maximum luminance value (RML) and/or a source maximum luminance value (SML).

In one embodiment, the color adjustment coefficient is obtained based on the following formula:

$$S = \begin{cases} B - C2 \times SatR1 \times f\left(\frac{(Y_{in} - A \times RML)}{(RML - A \times RML)}\right), & RML > Y_{in} > A \times RML \\ B - C2 \times SatR1, & Y_{in} \geq RML \end{cases},$$

where

S is the color adjustment coefficient, A is an adjustment range coefficient, B is a strength range coefficient, C2 is a second correction strength factor, $Y_{in}$ is a luminance component value of the color signal, f(x) is a monotonically increasing function when x is in an interval 0 to 1, and SatR1 is a first saturation adjustment coefficient.

In another embodiment, the color adjustment coefficient is obtained based on the following formula:

$$S = \begin{cases} B - C2 \times SatR1 \times \\ \quad f\left(\frac{(Y_{in} - A \times RML)}{(RML - A \times RML)}\right), & RML > Y_{in} > A \times RML \\ B - C2 \times SatR1 - \\ \quad C2 \times SatR2 \times g\left(\frac{(Y_{in} - RML)}{(SML - RML)}\right), & Y_{in} \geq RML \end{cases},$$

where

S is the color adjustment coefficient, A is an adjustment range coefficient, B is a strength range coefficient, C2 is a second correction strength factor, $Y_{in}$ is a luminance component value of the color signal, f(x) is a monotonic increasing function when x is in an interval 0 to 1, SatR1 is a first saturation adjustment coefficient, g(x) is a monotonic increasing function when x is in an interval 0 to 1, and SatR2 is a second saturation adjustment coefficient.

In another embodiment, the color adjustment coefficient is obtained based on the following formula:

$$S = \begin{cases} B - C2 \times SatR1 \times f\left(\frac{(Y_{in} - A \times RML)}{(RML - A \times RML)}\right), & RML > Y_{in} > A \times RML \\ B - C2 \times SatR1 - C2 \times SatR2 \times const & Y_{in} \geq RML \end{cases},$$

where

S is the color adjustment coefficient, A is an adjustment range coefficient, B is a strength range coefficient, C2 is a second correction strength factor, $Y_{in}$ is a luminance component value of the color signal, f(x) is a monotonic increasing function when x is in an interval 0 to 1, SatR1 is a first saturation adjustment coefficient, SatR2 is a second saturation adjustment coefficient, and const is a constant.

In one embodiment, at least one of RML, SML, A, B, C2, SatR1, and SatR2 is obtained based on decoded metadata, or is calculated based on information carried in the metadata.

It should be understood that, the foregoing parameters may all be obtained in one obtaining manner, or may be separately obtained in different obtaining manners.

In one embodiment, A is a preset value, and 0<A≤1. For example, A may be 0.1, 0.3, ⅓, 0.4, 0.5, 0.6, ⅔, 0.7, 0.8, or 0.9.

In another embodiment, A is calculated based on characteristics of a source picture signal. In one embodiment:

S91: Calculate a maximum color value of pixels in one pixel set in which the to-be-processed color signal is located.

The pixel set may be a picture frame or a picture sequence in which the to-be-processed color signal is located, or the like. It may be assumed that a maximum value in R, G, and B components of the RGB signal is the maximum color value. The maximum color value is obtained for each pixel in the pixel set. In different embodiments, alternatively, a minimum value, an intermediate value, or the like of R, G, and B components of a pixel may be obtained.

S92: Filter a pixel whose maximum color value is greater than RML from the pixel set in S91, to obtain a pixel subset.

S93: Perform cumulative histogram statistics on luminance values (Y components) of pixels in the pixel subset. A target luminance value Th is determined, and is enabled to meet the following condition: an accumulated quantity of pixels whose luminance values are between 0 and the target luminance value reaches a value of a preset ratio of a total quantity of the pixels of the pixel subset. For example, the preset ratio value may be 10%, 20%, 30%, 40%, or 50%.

S94: Determine A based on the target luminance value, where when Th/RML<TML/RML, A=TML/RML; when Th/RML>TT, A=TT; otherwise, A=Th/RML. TT is a preset value. For example, TT is 0.1, 0.3, ⅓, 0.4, 0.5, 0.6, ⅔, 0.7, 0.8, or 0.9.

In one embodiment, B is a preset value, and 0<B≤1. For example, B may be 0.1, 0.2, 0.3, 0.4, 0.5, 0.6, 0.7, 0.8, 0.9, or 1.0.

In one embodiment, B is determined based on the source maximum luminance value and a target display device maximum luminance value (TML). For example, B=SML/TML.

In another embodiment, B is determined based on the source maximum luminance values of a plurality of picture frames and TML. For example, B=ΣW$_i$×SML$_i$/TML, where i is an index of each frame in the plurality of picture frames, and W$_i$ is a coefficient value of an ith frame.

In one embodiment, SatR1 and SatR2 are preset values, 0<SatR1≤1, and 0<SatR2≤1. For example, SatR1 and SatR2 may be 0.3, 0.4, 0.5, 0.6, 0.7, 0.8, or 0.9.

In one embodiment, SatR1+SatR2≤1.

In one embodiment, SatR1 and SatR2 are calculated based on characteristics of a source picture signal. For example, SatR1 and SatR2 may be determined based on a picture frame in which the to-be-processed picture signal is located and characteristics of color signals of some or all of pixels in the plurality of picture frames.

In one embodiment, $f(x)=x$.
In one embodiment, $g(x)=x$.
In one embodiment, $f(x)=x^N$, and N>0.
In one embodiment, $g(x)=x^M$, and M>0.

In one embodiment, for example, const may be 0, 0.3, 0.4, 0.5, 0.6, 0.7, 0.8, 0.9, or 1.0.

In one embodiment, it may be assumed that the color adjustment coefficient is obtained based on the following formula:

$$S = \begin{cases} \left(\frac{Y}{Y_{in}}\right)^{C1}, & A \times RML > Y \\ 1 - C2 \times SatR \times \frac{(Y_{in} - A \times RML)}{(RML - A \times RML)}, & RML > Y_{in} \geq A \times RML \\ 1 - C2 \times SatR, & Y \geq RML \end{cases}$$

where

C1, C2, RML, and SML are obtained based on the decoded metadata, SatR is 0.8, and A=TML/RML.

For example, syntactic elements color_saturation_gain1 and color_saturation_gain2 may be decoded from the metadata, to calculate the values of C1 and C2:

$$C1 = \text{color\_saturation\_gain1}/15; \text{ and}$$
$$C2 = \text{color\_saturation\_gain2}/15.$$

S802: Adjust the chrominance component of the color signal based on the color adjustment coefficient.

For example, the chrominance components $C_b$ and $C_r$ are multiplied by the same color adjustment coefficient, to adjust the chrominance components:

$$Y' = Y$$
$$C'_b = C_b \cdot S$$
$$C'_r = C_r \cdot S.$$

Y', $C_b'$, $C_r'$ are adjusted chrominance components. Clearly, the luminance component does not change before and after adjustment.

S803: In one embodiment, convert the adjusted color signal from the $YC_bC_r$ color space back to the RGB color space:

$$\begin{bmatrix} R'_{ca} \\ G'_{ca} \\ B'_{ca} \end{bmatrix} = \begin{bmatrix} 1.0000 & 0.0000 & 1.4746 \\ 1.0000 & -0.1645 & -0.5713 \\ 1.0000 & 1.8814 & -0.0001 \end{bmatrix} \cdot \begin{bmatrix} Y' \\ C'_b \\ C'_r \end{bmatrix}.$$

S804: In one embodiment, denormalize the converted RGB signal from PQ domain to linear domain.

Figure 9:
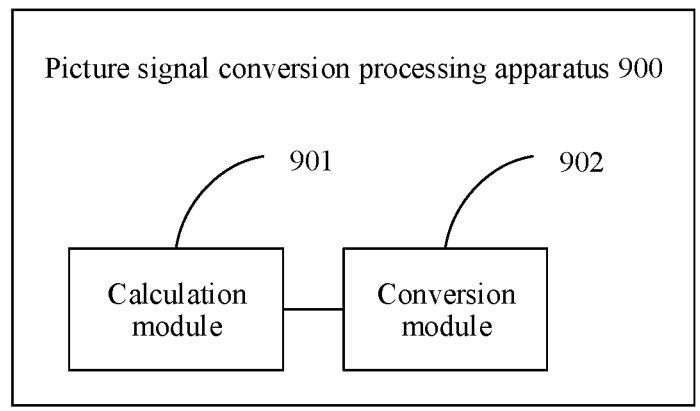
FIG. 9 is a schematic diagram of a structure of an example of another video signal processing apparatus according to an embodiment of this application.

FIG. 9 is a schematic diagram of a structure of a picture signal conversion processing apparatus according to an embodiment of this application. The picture signal conversion processing apparatus provided in this embodiment of the present disclosure may be configured to implement some or all of procedures of the picture signal conversion processing method embodiment described with reference to FIG. 8 in the present disclosure. A chrominance adjustment apparatus 900 shown in FIG. 9 includes: a calculation module 901, configured to determine a color adjustment coefficient of a chrominance component of a color signal based on a reference display device maximum luminance value (RML) and/or a source maximum luminance value (SML); and a conversion module 902, configured to adjust the chrominance component of the color signal based on the color adjustment coefficient.

In one embodiment, the color adjustment coefficient is obtained based on the following formula:

$$S = \begin{cases} B - C2 \times SatR1 \times f\left(\frac{(Y_{in} - A \times RML)}{(RML - A \times RML)}\right), & RML > Y_{in} > A \times RML \\ B - C2 \times SatR1, & Y_{in} \geq RML \end{cases},$$

where

S is the color adjustment coefficient, A is an adjustment range coefficient, B is a strength range coefficient, C2 is a second correction strength factor, $Y_{in}$ is a luminance component value of the color signal, f(x) is a monotonically increasing function when x is in an interval 0 to 1, and SatR1 is a first saturation adjustment coefficient.

For example, the foregoing formula may be:

$$S = \begin{cases} B - C2 \times SatR1 \times \frac{(Y_{in} - A \times RML)}{(RML - A \times RML)}, & RML > Y_{in} > A \times RML \\ B - C2 \times SatR1, & Y_{in} \geq RML \end{cases}.$$

For example, the foregoing formula may be simplified as:

$$S = \begin{cases} 1 - C2 \times SatR1 \times \frac{(Y_{in} - A \times RML)}{(RML - A \times RML)}, & RML > Y_{in} > A \times RML \\ 1 - C2 \times SatR1, & Y_{in} \geq RML \end{cases},$$

where
SatR1 is 0.8 or 0.7.

In one embodiment, the color adjustment coefficient is obtained based on the following formula:

$$S = \begin{cases} B - C2 \times SatR1 \times \\ f\left(\frac{(Y_{in} - A \times RML)}{(RML - A \times RML)}\right), & RML > Y_{in} > A \times RML \\ B - C2 \times SatR1 - C2 \times \\ SatR2 \times g\left(\frac{(Y_{in} - RML)}{(SML - RML)}\right), & Y_{in} \geq RML \end{cases},$$

where g(x) is a monotonically increasing function when x is in an interval 0 to 1, and SatR2 is a second saturation adjustment coefficient.

In one embodiment, at least one of RML, SML, A, B, C2, SatR1, and SatR2 is obtained based on decoded metadata, or is calculated based on information carried in the metadata.

In one embodiment, the reference display device maximum luminance value and/or the source maximum luminance value are/is determined based on a preset value, or determined based on the decoded metadata.

In one embodiment, A is a preset value, and 0<A≤1. For example, A may be 0.1, 0.3, ⅓, 0.4, 0.5, 0.6, ⅔, 0.7, 0.8, or 0.9.

In one embodiment, B is a preset value, and 0<B≤1. For example, B may be 0.1, 0.2, 0.3, 0.4, 0.5, 0.6, 0.7, 0.8, 0.9, or 1.0.

In one embodiment, B is determined based on the source maximum luminance value and a target display device maximum luminance value (TML).

In one embodiment, B is a ratio of SML to TML.

In one embodiment, SatR1 and SatR2 are preset values, 0<SatR1≤1, and 0<SatR2≤1. For example, SatR1 and SatR2 may be 0.3, 0.4, 0.5, 0.6, 0.7, 0.8, or 0.9.

In one embodiment, SatR1+SatR2≤1.

In one embodiment, f(x)=x.

In one embodiment, g(x)=x.

In one embodiment, f(x)=$x^N$, and N>0.

In one embodiment, g(x)=$x^M$, and M>0.

In one embodiment, g(x)=const, and const is a constant. For example, const may be 0, 0.3, 0.4, 0.5, 0.6, 0.7, 0.8, 0.9, or 1.0.

In one embodiment, the chrominance component is adjusted based on the following formulas:

$$C'_b = C_b \cdot S; \text{ and}$$

$$C'_r = C_r \cdot S,$$

where $C_b$, $C_r$ are chrominance components before the color signal is adjusted, and $C_b'$, $C_r'$ are chrominance components after the color signal is adjusted.

In one embodiment, a color correction process includes:

Input: an RGB color gamut pixel buffer f[$N_{frame}$] [3] of a to-be-processed frame, an RGB color gamut pixel buffer $f_{TM}$[$N_{frame}$] [3] on which dynamic range conversion processing is performed of the to-be-processed frame, metadata information, and a value RML of a maximum display luminance MaxDisplay of a display luminance range of a display device in PQ domain.

Output: a processed RGB color gamut pixel buffer $f_{color}$ [$N_{frame}$] [3] of the to-be-processed frame.

A process of color correction is as follows:

(1) If a color correction identifier color saturation mapping flag is 0, $f_{color}$[$N_{frame}$][0]=$f_{TM}$[$N_{frame}$] [0], $f_{color}$ [$N_{frame}$][1]=$f_{TM}$[$N_{frame}$] [1], $f_{color}$ [$N_{frame}$] [2]=$f_{TM}$[$N_{frame}$] [2], and the color correction process is ended.

Otherwise, color correction strengths C0 and C1 are calculated:

$$C0 = \text{color\_saturation\_gain}[0]; \text{ and}$$

$$C1 = \text{color\_saturation\_gain}[1].$$

(2) An input to-be-processed RGB signal f[i] [3] in PQ domain is converted into a color signal $Y_{in}C_{b\_in}C_{r\_in}$ in the $YC_bC_r$ format based on ITU-BT2020:

$$\begin{bmatrix} Y_{in} \\ C_{b\_in} \\ C_{r\_in} \end{bmatrix} = \begin{bmatrix} 0.2627 & 0.6780 & 0.0593 \\ -0.1396 & -0.3604 & 0.5000 \\ 0.5000 & -0.4598 & -0.0402 \end{bmatrix} \cdot \begin{bmatrix} f[i][0] \\ f[i][1] \\ f[i][2] \end{bmatrix}.$$

An RGB linear signal $f_{TM}$[i][3] is converted into a nonlinear signal $f_{TM\_PQ}$[i][3] in PQ domain:

$$f_{TM\_PQ}[i][3] = \text{PQ\_EOTF}^{-1}(f_{TM}[i][3]).$$

$f_{TM\_PQ}$[i][3] is converted into a color signal $YC_bC_r$ in the $YC_bC_r$ format based on ITU-BT2020:

$$\begin{bmatrix} Y \\ C_b \\ C_\gamma \end{bmatrix} = \begin{bmatrix} 0.2627 & 0.6780 & 0.0593 \\ -0.1396 & -0.3604 & 0.5000 \\ 0.5000 & -0.4598 & -0.0402 \end{bmatrix} \cdot \begin{bmatrix} f_{TM\_PQ}[i][0] \\ f_{TM\_PQ}[i][1] \\ f_{TM\_PQ}[i][2] \end{bmatrix}.$$

(3) The color adjustment coefficient $S_{ca}$ is calculated:
1. If Y is greater than A*RML, $$S_{ca} = \begin{cases} B - C1 \times SatR \times \left(\frac{Y_{in} - A \times RML}{RML - A \times RML}\right) & A \times RML < Y < RML \\ B - C1 \times SatR & Y \geq RML \end{cases},$$

where

A is an adjustment range coefficient, B is a strength range coefficient, SatR is a saturation correction factor, TML is a target display device maximum luminance value, and RML is a reference display device maximum luminance value. SatR uses 0.7 by default, a value of A is TML/RML by default, and a value of B is 1 by default.

2. Otherwise, the color adjustment coefficient $S_{ca}$ is related to a luminance Y and a tone-mapping curve, and a calculation formula is:

$$S_{ca} = \left(\frac{Y}{Y_{in}}\right)^{C0}, k \in [0, 1],$$

where $Y_{in}$ is a Y component of the $YC_bC_r$ signal that is in PQ domain and that is converted from the input signal in linear RGB domain.

(4) Color adjustment is performed on the $YC_bC_r$ signal.

$C_b$ and $C_r$ are multiplied by the same color adjustment coefficient $S_{ca}$:

$$Y' = Y$$
$$C'_b = C_b \cdot S_{ca}$$
$$C'_r = C_r \cdot S_{ca}.$$

The $YC_bC_r$ signal is converted back to the RGB signal in PQ domain:

$$\begin{bmatrix} R'_{ca} \\ G'_{ca} \\ B'_{ca} \end{bmatrix} = \begin{bmatrix} 1.0000 & 0.0000 & 1.4746 \\ 1.0000 & -0.1645 & -0.5713 \\ 1.0000 & 1.8814 & -0.0001 \end{bmatrix} \cdot \begin{bmatrix} Y' \\ C'_b \\ C'_r \end{bmatrix}.$$

(5) The RGB signal in PQ domain is converted back to linear domain to obtain ($R_{color1}$, $G_{color1}$, $B_{color1}$):

$$R_{color1} = PQ\_EOTF(R'_{ca});$$
$$G_{color1} = PQ\_EOTF(G'_{ca});\text{ and}$$
$$B_{color1} = PQ\_EOTF(B'_{ca}).$$

(6) $f_{color}[N_{frame}][0]=R_{color1}$, $f_{color}[N_{frame}][1]=G_{color1}$, and $f_{color}[N_{frame}][2]=B_{color1}$.

Figure 10:
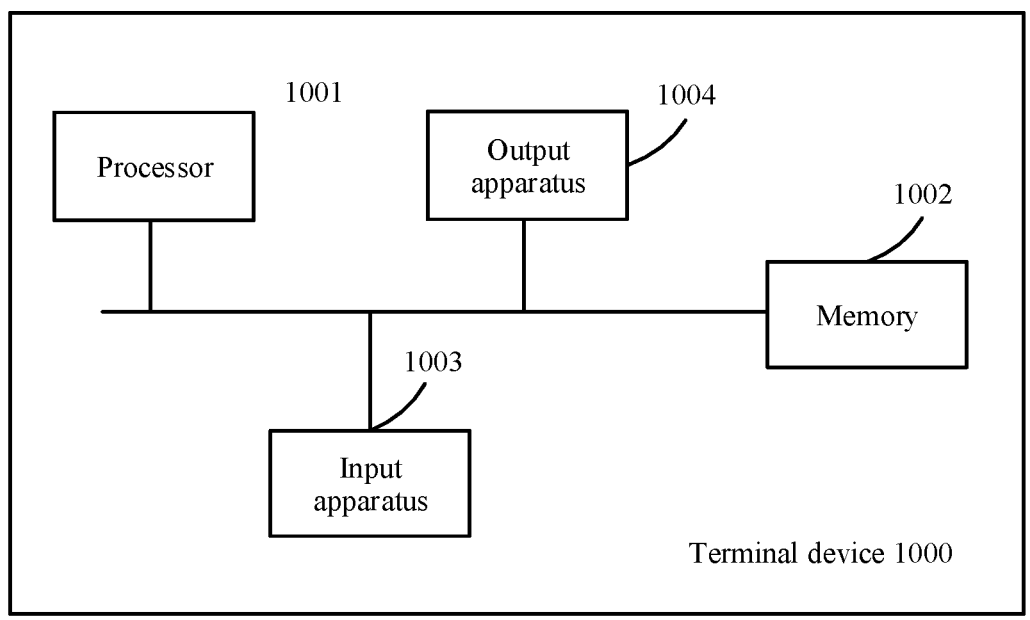
FIG. 10 is a schematic diagram of a structure of an example of still another video signal processing apparatus according to an embodiment of this application.

FIG. 10 is a schematic diagram of a structure of a terminal device according to an embodiment of this application. As shown in FIG. 10, the terminal device 1000 may include: a processor 1001, a memory 1002, an input apparatus 1003, and an output apparatus 1004. The processor 1001 is connected to the memory 1002, the input apparatus 1003, and the output apparatus 1004. For example, the processor 1001 may be connected to the memory 1002, the input apparatus 1003, and the output apparatus 1004 by using a bus.

The processor 1001 may be a central processing unit (CPU), a network processor (NP), or the like.

The memory 1002 may include a volatile memory, such as a random-access memory (RAM); or the memory may include a non-volatile memory, such as a read-only memory (ROM), a flash memory, a hard disk drive (HDD), or a solid-state drive (SSD); or the memory may include a combination of the memories of the foregoing types.

The processor 1001 is configured to perform some or all of procedures in the picture signal conversion processing method embodiment described in FIG. 5, FIG. 6, or FIG. 8.

Example 1: A saturation adjustment method, including:

determining a saturation adjustment factor of one color component of a color signal based on at least one saturation adjustment parameter, where the saturation parameter includes: a reference display device maximum luminance value (RML), a source maximum luminance value (SML), a target display device maximum luminance value (TML), and a saturation adjustment strength (SatR); and adjusting the color component based on a maximum value of a plurality of color components of the color signal and the saturation adjustment factor of the color component.

Example 2: The method according to Example 1, where the color signal is an RGB signal, and the adjusting the color component based on a maximum value of a plurality of color components of the color signal and the saturation adjustment factor of the color component includes:

adjusting one of R, G, and B components based on a maximum value of the red (R), green (G), and blue (B) components in the RGB signal and the saturation adjustment factor corresponding to one of the R, G, and B components.

Example 3: The method according to Example 1 or 2, where the R, G, and B components are adjusted based on the following formulas:

$$\begin{cases} R_{out} = R_{in} + (MAX(R_{in}, G_{in}, B_{in}) - R_{in}) \times W_R \\ G_{out} = G_{in} + (MAX(R_{in}, G_{in}, B_{in}) - G_{in}) \times W_G, \\ B_{out} = B_{in} + (MAX(R_{in}, G_{in}, B_{in}) - B_{in}) \times W_B \end{cases}$$

where $R_{in}$, $G_{in}$, $B_{in}$ are respectively the R, G, and B components in the RGB signal, MAX( ) is a maximum value obtaining function, $W_R$, $W_G$, $W_B$ are respectively saturation adjustment factors corresponding to the R, G, and B components, and $R_{out}$, $G_{out}$, $B_{out}$ are respectively the adjusted R, G, and B components.

Example 4: The method according to Example 3, further including: adjusting the R, G, and B components based on a first correction strength factor; and correspondingly, adjusting the R, G, and B components based on the following formulas:

$$\begin{cases} R_{out} = R_{in} + (MAX(R_{in}, G_{in}, B_{in}) - R_{in}) \times W_R \times C1 \\ G_{out} = G_{in} + (MAX(R_{in}, G_{in}, B_{in}) - G_{in}) \times W_G \times C1, \\ B_{out} = B_{in} + (MAX(R_{in}, G_{in}, B_{in}) - B_{in}) \times W_B \times C1 \end{cases}$$

where

C1 is the first correction strength factor.

Example 5: The method according to Example 4, where the first correction strength factor is obtained based on decoded metadata, or is calculated based on information carried in the metadata.

Example 6: The method according to any one of Examples 1 to 5, where the color signal is a to-be-displayed signal after dynamic range adjustment is performed.

Example 7: The method according to any one of Examples 2 to 6, where the saturation adjustment factor is obtained based on the following formula:

$$W_N = \begin{cases} SatR + \dfrac{(1-SatR) \times (N_{in} - RML)}{(SML - RML)}, & N_{in} \geq RML \\ \dfrac{SatR \times (N_{in} - RML)}{(SML - RML)}, & RML > N_{in} \geq TML \\ 0, & \text{other} \end{cases}$$

where $N_{in}$ is one of $R_{in}$, $G_{in}$, $B_{in}$, and $W_N$ is the saturation adjustment factor corresponding to the color component represented by $N_{in}$.

Example 8: The method according to any one of Examples 5 to 7, where at least one of the reference display device maximum luminance value, the source maximum luminance value, and the saturation adjustment strength is determined based on a preset value, or at least one of the reference display device maximum luminance value, the source maximum luminance value, and the saturation adjustment strength is determined based on the decoded metadata.

Example 9: The method according to Example 8, where the saturation adjustment strength is 0.8.

Example 10: The method according to any one of Examples 1 to 9, where the target display device maximum luminance value is obtained based on a parameter of a target display device.

Example 11: The method according to any one of Examples 1 to 10, where when the color signal is a non-RGB signal, before the determining a saturation adjustment factor of one color component of a color signal based on at least one saturation adjustment parameter, the method further includes:

converting the non-RGB signal into an RGB signal and using the RGB signal as the color signal.

Example 12: A saturation adjustment apparatus, including:

a calculation module, configured to determine a saturation adjustment factor of one color component of a color signal based on at least one saturation adjustment parameter, where the saturation parameter includes: a reference display device maximum luminance value (RML), a source maximum luminance value (SML), a target display device maximum luminance value (TML), and a saturation adjustment strength (SatR); and a conversion module, configured to adjust the color component based on a maximum value of a plurality of color components of the color signal and the saturation adjustment factor of the color component.

Example 13: The apparatus according to Example 12, where the color signal is an RGB signal, and the conversion module is configured to:

adjust one of R, G, and B components based on a maximum value of the red (R), green (G), and blue (B) components in the RGB signal and the saturation adjustment factor corresponding to one of the R, G, and B components.

Example 14: The apparatus according to Example 12 or 13, where the R, G, and B components are adjusted based on the following formulas:

$$\begin{cases} R_{out} = R_{in} + (\text{MAX}(R_{in}, G_{in}, B_{in}) - R_{in}) \times W_R \\ G_{out} = G_{in} + (\text{MAX}(R_{in}, G_{in}, B_{in}) - G_{in}) \times W_G, \\ B_{out} = B_{in} + (\text{MAX}(R_{in}, G_{in}, B_{in}) - B_{in}) \times W_B \end{cases}$$

where $R_{in}$, $G_{in}$, $B_{in}$ are respectively the R, G, and B components in the RGB signal, MAX( ) is a maximum value obtaining function, $W_R$, $W_G$, $W_B$ are respectively saturation adjustment factors corresponding to the R, G, and B components, and $R_{out}$, $G_{out}$, $B_{out}$ are respectively the adjusted R, G, and B components.

Example 15: The apparatus according to Example 14, where the conversion module is further configured to: adjust the R, G, and B components based on a first correction strength factor; and correspondingly, adjust the R, G, and B components based on the following formulas:

$$\begin{cases} R_{out} = R_{in} + (\text{MAX}(R_{in}, G_{in}, B_{in}) - R_{in}) \times W_R \times C1 \\ G_{out} = G_{in} + (\text{MAX}(R_{in}, G_{in}, B_{in}) - G_{in}) \times W_G \times C1, \\ B_{out} = B_{in} + (\text{MAX}(R_{in}, G_{in}, B_{in}) - B_{in}) \times W_B \times C1 \end{cases}$$

where

C1 is the first correction strength factor.

Example 16: The apparatus according to Example 15, where the first correction strength factor is obtained based on decoded metadata, or is calculated based on information carried in the metadata.

Example 17: The apparatus according to any one of Examples 12 to 15, where the color signal is a to-be-displayed signal after dynamic range adjustment is performed.

Example 18: The apparatus according to any one of Examples 13 to 17, where the saturation adjustment factor is obtained based on the following formula:

$$W_N = \begin{cases} SatR + \dfrac{(1-SatR) \times (N_{in} - RML)}{(SML - RML)}, & N_{in} \geq RML \\ \dfrac{SatR \times (N_{in} - RML)}{(SML - RML)}, & RML > N_{in} \geq TML \\ 0, & \text{other} \end{cases}$$

where $N_{in}$ is one of $R_{in}$, $G_{in}$, $B_{in}$, and $W_N$ is the saturation adjustment factor corresponding to the color component represented by $N_{in}$.

Example 19: The apparatus according to any one of Examples 16 to 18, where at least one of the reference display device maximum luminance value, the source maximum luminance value, and the saturation adjustment strength is determined based on a preset value, or at least one of the reference display device maximum luminance value, the source maximum luminance value, and the saturation adjustment strength is determined based on the decoded metadata.

Example 20: The apparatus according to Example 19, where the saturation adjustment strength is 0.8.

Example 21: The apparatus according to any one of Examples 12 to 20, where the target display device maximum luminance value is obtained based on a parameter of a target display device.

Example 22: The apparatus according to any one of Examples 12 to 21, where when the color signal is a non-RGB signal, the calculation module is further configured to:

convert the non-RGB signal into an RGB signal and use the RGB signal as the color signal.

Example 23: A chrominance adjustment method, including:

determining a color adjustment coefficient of a chrominance component of a color signal based on a reference display device maximum luminance value (RML) and/or a source maximum luminance value (SML); and adjusting the chrominance component of the color signal based on the color adjustment coefficient.

Example 24: The method according to Example 23, where the color adjustment coefficient is obtained based on the following formula:

$$S = \begin{cases} B - C2 \times SatR1 \times f\left(\frac{(Y_{in} - A \times RML)}{(RML - A \times RML)}\right), & RML > Y_{in} > A \times RML \\ B - C2 \times SatR1, & Y_{in} \geq RML \end{cases},$$

where

S is the color adjustment coefficient, A is an adjustment range coefficient, B is a strength range coefficient, C2 is a second correction strength factor, $Y_{in}$ is a luminance component value of the color signal, f(x) is a monotonically increasing function when x is in an interval 0 to 1, and SatR1 is a first saturation adjustment coefficient.

Example 25: The method according to Example 23, where the color adjustment coefficient is obtained based on the following formula:

$$S = \begin{cases} B - C2 \times SatR1 \times f\left(\frac{(Y_{in} - A \times RML)}{(RML - A \times RML)}\right), & RML > Y_{in} > A \times RML \\ B - C2 \times SatR1 - C2 \times SatR2 \times g\left(\frac{(Y_{in} - RML)}{(SML - RML)}\right), & Y_{in} \geq RML \end{cases},$$

where g(x) is a monotonically increasing function when x is in an interval 0 to 1, and SatR2 is a second saturation adjustment coefficient.

Example 26: The method according to Example 25, where at least one of RML, SML, A, B, C2, SatR1, and SatR2 is obtained based on decoded metadata, or is calculated based on information carried in the metadata.

Example 27: The method according to any one of Examples 24 to 26, where the reference display device maximum luminance value and/or the source maximum luminance value are/is determined based on a preset value, or determined based on the decoded metadata.

Example 28: The method according to any one of Examples 24 to 27, where A is a preset value, and 0<A≤1.

Example 29: The method according to any one of Examples 24 to 28, where B is a preset value, and 0<B≤1.

Example 30: The method according to any one of Examples 24 to 28, where B is determined based on the source maximum luminance value and a target display device maximum luminance value (TML).

Example 31: The method according to Example 30, where B is a ratio of SML to TML.

Example 32: The method according to any one of Examples 24 to 31, where SatR1 and SatR2 are preset values, 0<SatR1≤1, and 0<SatR2≤1.

Example 33: The method according to Example 32, where SatR1+SatR2≤1.

Example 34: The method according to any one of Examples 24 to 33, where f(x)=x.

Example 35: The method according to any one of Examples 24 to 33, where $f(x)=x^N$, and N>0.

Example 36: The method according to any one of Examples 25 to 35, where $g(x)=x^M$, and M>0.

Example 37: The method according to any one of Examples 25 to 36, where g(x)=x.

Example 38: The method according to any one of Examples 24 to 37, where the chrominance component is adjusted based on the following formulas:

$$C_b' = C_b \cdot S; \text{ and } C_r' = C_r \cdot S,$$

where $C_b$, $C_r$ are chrominance components before the color signal is adjusted, and $C_b'$, $C_r'$ are chrominance components after the color signal is adjusted.

Example 39: A chrominance adjustment apparatus, including:

a calculation module, configured to determine a color adjustment coefficient of a chrominance component of a color signal based on a reference display device maximum luminance value (RML) and/or a source maximum luminance value (SML); and a conversion module, configured to adjust the chrominance component of the color signal based on the color adjustment coefficient.

Example 40: The apparatus according to Example 39, where the color adjustment coefficient is obtained based on the following formula:

$$S = \begin{cases} B - C2 \times SatR1 \times f\left(\frac{(Y_{in} - A \times RML)}{(RML - A \times RML)}\right), & RML > Y_{in} > A \times RML \\ B - C2 \times SatR1, & Y_{in} \geq RML \end{cases},$$

where

S is the color adjustment coefficient, A is an adjustment range coefficient, B is a strength range coefficient, C2 is a second correction strength factor, $Y_{in}$ is a luminance component value of the color signal, f(x) is a monotonically increasing function when x is in an interval 0 to 1, and SatR1 is a first saturation adjustment coefficient.

Example 41: The apparatus according to Example 39, where the color adjustment coefficient is obtained based on the following formula:

$$S = \begin{cases} B - C2 \times SatR1 \times f\left(\frac{(Y_{in} - A \times RML)}{(RML - A \times RML)}\right), & RML > Y_{in} > A \times RML \\ B - C2 \times SatR1 - C2 \times SatR2 \times g\left(\frac{(Y_{in} - RML)}{(SML - RML)}\right), & Y_{in} \geq RML \end{cases},$$

where g(x) is a monotonically increasing function when x is in an interval 0 to 1, and SatR2 is a second saturation adjustment coefficient.

Example 42: The apparatus according to Example 41, where at least one of RML, SML, A, B, C2, SatR1, and SatR2 is obtained based on decoded metadata, or is calculated based on information carried in the metadata.

Example 43: The apparatus according to any one of Examples 40 to 42, where the reference display device maximum luminance value and/or the source maximum luminance value are/is determined based on a preset value, or determined based on the decoded metadata.

Example 44: The apparatus according to any one of Examples 40 to 43, where A is a preset value, and 0<A≤1.

Example 45: The apparatus according to any one of Examples 40 to 44, where B is a preset value, and 0<B≤1.

Example 46: The apparatus according to any one of Examples 40 to 44, where B is determined based on the source maximum luminance value and a target display device maximum luminance value (TML).

Example 47: The apparatus according to Example 46, where B is a ratio of SML to TML.

Example 48: The apparatus according to any one of Examples 40 to 47, where SatR1 and SatR2 are preset values, 0<SatR1≤1, and 0<SatR2≤1.

Example 49: The apparatus according to Example 48, where SatR1+SatR2≤1.

Example 50: The apparatus according to any one of Examples 40 to 49, where f(x)=x.

Example 51: The apparatus according to any one of Examples 40 to 49, where $f(x)=x^N$, and N>0.

Example 52: The apparatus according to any one of Examples 41 to 51, where $g(x)=x^M$, and M>0.

Example 53: The apparatus according to any one of Examples 41 to 52, where g(x)=x.

Example 54: The apparatus according to any one of claims 40 to 53, where the chrominance component is adjusted based on the following formulas:

$$C'_b = C_b \cdot S; \text{ and } C'_r = C_r \cdot S,$$

where $C_b$, $C_r$ are chrominance components before the color signal is adjusted, and $C_b'$, $C_r'$ are chrominance components after the color signal is adjusted.

Example 55: A picture processing device, including: a non-volatile memory and a processor that are coupled to each other, where the processor invokes program code stored in the memory, to perform the method according to any one of Examples 1 to 11 and Examples 23 to 38.

Example 56: A computer-readable storage medium, where the computer-readable storage medium stores a computer program, and when the computer program is run on a processor, the method according to any one of Examples 1 to 11 and Examples 23 to 38 is implemented.

It should be understood that, the processor mentioned in embodiments of this application may be a central processing unit (CPU), or may be another general-purpose processor, a digital signal processor (DSP), an application-specific integrated circuit (ASIC), or a field programmable gate array (FPGA), or another programmable logic device, discrete gate, transistor logic device, discrete hardware component, or the like. The general-purpose processor may be a microprocessor, or the processor may be any conventional processor or the like.

It may be understood that the memory mentioned in embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EPROM), or a flash memory. The volatile memory may be a random access memory (RAM), used as an external cache. By way of example rather than limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

It should be noted that the memory described in this disclosure includes but is not limited to these memories and any memory of another proper type.

It should be further understood that various numbers such as first and the second in this disclosure are merely used for differentiation for ease of description, and are not construed as a limitation on the scope of this application.

In this application, "and/or" describes an association relationship between associated objects, and indicates that three relationships may exist. For example, A and/or B may indicate the following three cases: Only A exists, both A and B exist, and only B exists, where A and B may be singular or plural. The character "/" generally indicates an "or" relationship between the associated objects.

In this application, "at least one" means one or more, and "a plurality of" means two or more. "At least one of the following items (pieces)" or a similar expression thereof is any combination of these items, including any combination of singular items (pieces) or plural items (pieces). For example, "at least one of a, b, or c", or "at least one of a, b, and c" may indicate: a, b, c, a-b (namely, a and b), a-c, b-c, or a-b-c, where a, b, and c may be singular or plural.

It should be understood that sequence numbers of the foregoing processes do not mean execution sequences in various embodiments of this application. Some or all of the operations may be performed in parallel or in sequence. The execution sequences of the processes should be determined based on functions and internal logic of the processes, and should not be construed as any limitation on the implementation processes of embodiments of this application.

A person of ordinary skill in the art may be aware that units and algorithm operations in the examples described with reference to embodiments disclosed in this disclosure may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, function units in embodiments of this application may be integrated into one processing unit, each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, a terminal device, or the like) to perform all or some of the operations of the methods in the embodiments of this application. The foregoing storage medium includes various media that can store program code, for example, a USB flash drive, a removable hard disk, a read-only memory (Read-Only Memory, ROM), a random access memory (Random Access Memory, RAM), a magnetic disk, and an optical disc.

Related parts between the method embodiments of this application may be mutually referenced; and apparatuses provided in the apparatus embodiments are configured to perform the methods provided in corresponding method embodiments. Therefore, the apparatus embodiments may be understood with reference to related parts in the related method embodiments.

The diagrams of the structures of the apparatuses provided in the apparatus embodiments of this application show only simplified designs of corresponding apparatuses. In actual application, the apparatus may include any quantity of transmitters, receivers, processors, memories, and the like, to implement functions or operations performed by the apparatus in the apparatus embodiments of this application, and all apparatuses that can implement this application fall within the protection scope of this application.

Names of messages/frames/indication information, modules, units, or the like provided in embodiments of this application are merely examples, and other names may be used provided that the messages/frames/indication information, modules, units, or the like have same functions.

The terms used in embodiments of this application are merely for the purpose of illustrating embodiments, and are not intended to limit the present disclosure. The terms "a", "the" and "this" of singular forms used in embodiments and the appended claims of this application are also intended to include plural forms, unless otherwise specified in the context clearly. It should also be understood that, the term "and/or" used herein indicates and includes any or all possible combinations of one or more associated listed items. The character "/" in this disclosure generally indicates an "or" relationship between the associated objects. If the character "/" appears in a formula involved in this disclosure, the character usually indicates that in the formula, an object appearing before the "/" is divided by an object appearing after the "/". If the character "^" appears in a formula involved in this disclosure, it generally indicates a mathematical power operation.

Depending on the context, for example, the word "if" used herein may be explained as "while", "when", "in response to determining", or "in response to detection". Similarly, depending on the context, the phrase "if determining" or "if detecting (a stated condition or event)" may be explained as "when determining", "in response to determining", "when detecting (the stated condition or event)", or "in response to detecting (the stated condition or event)".

A person of ordinary skill in the art may understand that all or some of the operations of the method in any foregoing embodiment may be implemented by a program instructing related hardware. The program may be stored in a readable storage medium of a device, such as a flash or an EEPROM. When the program is run, all or some of the operations described above are included.

The objectives, technical solutions, and beneficial effects of the present disclosure are further described in detail in the foregoing implementations. It may be understood that the foregoing embodiments are examples and cannot be construed as a limitation on the present disclosure. A person of ordinary skill in the art may make variations, modifications, substitutions, and transformations of the foregoing embodiments within the scope of the present disclosure.

What is claimed is:

1. A chrominance adjustment method, comprising:
   determining a color adjustment coefficient of a chrominance component of a color signal based on at least one of a reference display device maximum luminance value (RML) or a source maximum luminance value (SML), wherein the color adjustment coefficient is determined based on the following formula:

$$S = \begin{cases} B - C2 \times SatR1 \times f\left(\frac{(Y_{in} - A \times RML)}{(RML - A \times RML)}\right), & RML > Y_{in} > A \times RML \\ B - C2 \times SatR1, & Y_{in} \geq RML \end{cases},$$

wherein
   S is the color adjustment coefficient, A is an adjustment range coefficient, B is a strength range coefficient, C2 is a second correction strength factor, $Y_{in}$ is a luminance component value of the color signal, f(x) is a monotonically increasing function when x is in an interval 0 to 1, and SatR1 is a first saturation adjustment coefficient; and
   adjusting the chrominance component of the color signal based on the color adjustment coefficient.

2. The method according to claim 1, wherein the at least one of the RML or the SML is determined based on a preset value, or determined based on the decoded metadata.

3. The method according to claim 1, wherein A is a preset value, and 0<A≤1.

4. The method according to claim 1, wherein B is a preset value, and 0<B≤1.

5. The method according to claim 1, wherein B is determined based on the SML and a target display device maximum luminance value (TML).

6. The method according to claim 5, wherein B is a ratio of the SML to the TML.

7. The method according to claim 1, wherein SatR1 and SatR2 are preset values, 0<SatR1≤1, and 0<SatR2≤1.

8. The method according to claim 7, wherein SatR1+SatR2≤1.

9. The method according to claim 1, wherein f(x)=x.

10. The method according to claim 1, wherein $f(x)=x^N$, and N>0.

11. The method according to claim 1, wherein the chrominance component is adjusted based on the following formulas:

$$C'_b = C_b \cdot S; \text{ and}$$

$$C'_r = C_r \cdot S,$$

wherein
$C_b$, $C_r$ are chrominance components before the color signal is adjusted, and $C'_b, C'_r$ are chrominance components after the color signal is adjusted.

12. A chrominance adjustment method, comprising:
determining a color adjustment coefficient of a chrominance component of a color signal based on at least one of a reference display device maximum luminance value (RML) or a source maximum luminance value (SML), wherein the color adjustment coefficient is determined based on the following formula:

$$S = \begin{cases} B - C2 \times SatR1 \times \frac{(Y_{in} - A \times RML)}{(RML - A \times RML)}, & RML > Y_{in} > A \times RML \\ B - C2 \times SatR1, & Y_{in} \geq RML \end{cases},$$

wherein
S is the color adjustment coefficient, A is an adjustment range coefficient, B is a strength range coefficient, C2 is a second correction strength factor, $Y_{in}$ is a luminance component value of the color signal, and SatR1 is a first saturation adjustment coefficient; and
adjusting the chrominance component of the color signal based on the color adjustment coefficient.

13. A chrominance adjustment method, comprising:
determining a color adjustment coefficient of a chrominance component of a color signal based on at least one of a reference display device maximum luminance value (RML) or a source maximum luminance value (SML), wherein the color adjustment coefficient is determined based on the following formula:

$$S = \begin{cases} B - C2 \times SatR1 \times \\ \quad f\left(\frac{(Y_{in} - A \times RML)}{(RML - A \times RML)}\right), \quad RML > Y_{in} > A \times RML \\ B - C2 \times SatR1 - C2 \times \\ \quad SatR2 \times g\left(\frac{(Y_{in} - RML)}{(SML - RML)}\right), \quad Y_{in} \geq RML \end{cases},$$

wherein
S is the color adjustment coefficient, A is an adjustment range coefficient, B is a strength range coefficient, C2 is a second correction strength factor, $Y_{in}$ is a luminance component value of the color signal, f(x) is a monotonically increasing function when x is in an interval 0 to 1, and SatR1 is a first saturation adjustment coefficient, g(x) is a monotonically increasing function when x is in an interval 0 to 1, and SatR2 is a second saturation adjustment coefficient; and
adjusting the chrominance component of the color signal based on the color adjustment coefficient.

14. The method according to claim 13, wherein at least one of RML, SML, A, B, C2, SatR1, and SatR2 is determined based on decoded metadata, or is calculated based on information carried in the metadata.

15. The method according to claim 13, wherein $g(x)=x^M$, and M>0.

16. The method according to claim 13, wherein g(x)=x.

17. An apparatus for a chrominance adjustment, comprising:
a processor; and
a memory coupled to the processor to store instructions, which when executed by the processor, cause the apparatus to
determine a color adjustment coefficient of a chrominance component of a color signal based on at least one of a reference display device maximum luminance value (RML) or a source maximum luminance value (SML), wherein the color adjustment coefficient is determined based on the following formula:

$$S = \begin{cases} B - C2 \times SatR1 \times f\left(\frac{(Y_{in} - A \times RML)}{(RML - A \times RML)}\right), & RML > Y_{in} > A \times RML \\ B - C2 \times SatR1, & Y_{in} \geq RML \end{cases},$$

wherein
S is the color adjustment coefficient, A is an adjustment range coefficient, B is a strength range coefficient, C2 is a second correction strength factor, $Y_{in}$ is a luminance component value of the color signal, f(x) is a monotonically increasing function when x is in an interval 0 to 1, and SatR1 is a first saturation adjustment coefficient; and
adjust the chrominance component of the color signal based on the color adjustment coefficient.

* * * * *